US012726269B2

(12) United States Patent
Fehrenbach et al.

(10) Patent No.: US 12,726,269 B2
(45) Date of Patent: Sep. 1, 2026

(54) RADIO DEVICE, READER DEVICE AND METHOD FOR OPERATING THEM

(71) Applicant: Fraunhofer-Gesellschaft zur Förderung der angewandten Forschung e.V., Munich (DE)

(72) Inventors: Thomas Fehrenbach, Berlin (DE); Baris Göktepe, Berlin (DE); Thomas Wirth, Berlin (DE); Thomas Schierl, Berlin (DE); Cornelius Hellge, Berlin (DE); Thomas Wiegand, Berlin (DE); Alvaro López Raventós, Berlin (DE); Buket Torun, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 19/348,272

(22) Filed: Oct. 2, 2025

(65) Prior Publication Data

US 2026/0095249 A1 Apr. 2, 2026

(30) Foreign Application Priority Data

Oct. 2, 2024 (EP) .................................... 24204390

(51) Int. Cl.
*H04B 7/22* (2006.01)
*H04B 7/155* (2006.01)

(52) U.S. Cl.
CPC ........... *H04B 7/22* (2013.01); *H04B 7/15521* (2013.01)

(58) Field of Classification Search
CPC .............................. H04B 7/22; H04B 7/15521
USPC .......................................................... 375/262
See application file for complete search history.

(56) References Cited

U.S. PATENT DOCUMENTS

| | | | | |
|---|---|---|---|---|
| 2002/0167405 | A1 | 11/2002 | Shanks | |
| 2009/0160622 | A1 | 6/2009 | Bauchot | |
| 2024/0175965 | A1 * | 5/2024 | Wang | G01S 13/878 |
| 2024/0421856 | A1 * | 12/2024 | Patchava | H04B 5/77 |

FOREIGN PATENT DOCUMENTS

| | | | |
|---|---|---|---|
| WO | 2024016201 | A1 | 1/2024 |

OTHER PUBLICATIONS

Niu, J.P., et al.; "An Overview on Backscatter Communications;" Journal of Communications and Information Networks; vol. 4; No. 2; Jun. 2019; pp. 1-14.
"3rd Generation Partnership Project; Technical Specification Group Radio Access Network; NR; Ambient IoT Medium Access Control Protocol specification (Release 19);" 3GPP TS 38.391 V1.0.0; Sep. 2025; pp. 1-24.
"3rd Generation Partnership Project; Technical Specification Group Services and System Aspects; Architecture support for Ambient power-enabled Internet of Things; Stage 2 (Release 19);" 3GPP TS 23.369 V19.0.0; Jun. 2025; pp. 1-34.
(Continued)

*Primary Examiner* — Fitwi Y Hailegiorgis
(74) *Attorney, Agent, or Firm* — McClure, Qualey & Rodack, LLP

(57) ABSTRACT

A radio device for a wireless communication network includes a backscatter transmitter for transmitting a signal using a backscattered signal, and to at least one or more groups of a plurality of different device groups.

28 Claims, 11 Drawing Sheets

(56) References Cited

OTHER PUBLICATIONS

"3rd Generation Partnership Project; Technical Specification Group Radio Access Network; NR; Ambient loT Base Station (BS) and Carrier-Wave (CW) node radio transmission and reception (Release 19);" 3GPP TS 38.194 V1.0.0; Sep. 2025; pp. 1-48.
International Search Report and Written Opinion dated Feb. 24, 2026, issued in application No. PCT/EP2025/078410.

* cited by examiner

RADIO DEVICE, READER DEVICE AND METHOD FOR OPERATING THEM

CROSS-REFERENCE TO RELATED APPLICATION

This application claims priority from European Application No. 24204390.9, which was filed on Oct. 2, 2024, and is incorporated herein by reference in its entirety.

TECHNICAL FIELD

The present invention relates to the field of radio devices and reader devices for wireless communication systems or networks, more specifically to low complexity radio devices employing low-power communication techniques. Embodiments of the present invention concern access enhancements for low complexity radio devices using backscatter communication techniques for transmitting a signal.

BACKGROUND OF THE INVENTION

Low complexity radio devices using backscattered communication techniques for transmitting a signal are well-known, see, e.g., Jin-Ping Niu, Geoffrey Ye Li in "An Overview on Backscatter Communications", Journal of Communications and Information Networks, Vol. 4, No. 2, June 2019. One example of low complexity radio devices using backscatter communication techniques are radio frequency identification, RFID, tags. An RFID tag identification is performed through a series of interactions between an RFID reader and an RFID tag. Radio frequency signals are used to communicate and exchange data between the RFID reader and the RFID tag. An RFID tag, which has a unique identification, ID, responds to a query of an RFID reader by transmitting information stored in the RFID tag. This process, also known as inventorying, uses anti-collision algorithms, like the slotted ALOHA protocol, to manage multiple tags within a RFID reader's field or communication range and for avoiding signal interferences. The RFID tags are typically identified individually, with the RFID reader sequentially querying each RFID tag to compile a list of all RFID tags within the RFID reader's communication range. The actual identification process varies dependent on the type of RFID tags in use, which may be passive, semi-passive or active. Passive RFID tags, which are most common due to their cost-effectiveness, rely entirely on the RFID reader's signal for power. These RFID tags backscatter the received signal to transmit data stored in the RFID tag. Semi-passive RFID tags have an internal battery to power the circuits of the RFID tag thereby improving the read range and the data transmission reliability. Active RFID tags, which are equipped with an own power source, may communicate over greater distances and may store more data, making them suitable for applications requiring more coverage.

Another technology using low complexity devices using backscatter communication techniques for low power consumption involve Internet-of-Thing, IoT, devices in accordance with the 3GPP standard. Such IoT devices are currently further developed so as to provide ultra-low complexity devices with ultra-low power consumption, especially for very low end IoT applications. Such further developed IoT devices, like Ambient IoT devices, are well-below the existing 3GPP technologies, e.g., narrowband IoT (NB-IoT) devices, enhanced Machine Type Communication (eMTC) devices, or devices with reduce capabilities (RedCap devices). The further development of IoT devices towards ultra-low complexity devices with ultra-low power consumption is not driven by a desire to replace existing low-power wide area, LPWA, systems, rather, it is driven by the desire to provide a missing piece of ultra-low complexity and ultra-low power devices in the 3GPP system such that other 3GPP devices, like a user equipment or user device, UE, a base station, BS, or any New Generation Radio Access Network (NG-RAN) node may directly or indirectly connect with such devices or may be used for controlling or managing a whole system including thousands of low complexity devices like Ambient IoT devices. The ultra-low complexity IoT devices having ultra-low power consumption may be classified in the following power classes:

(1) The device has a peak power consumption of about 1 μW and includes an energy storage. The device has an initial sampling frequency offset, SFO, of up to $10^x$ ppm. The device provides neither a downlink, DL, amplification nor an uplink, UL, amplification. An uplink transmission of the device is backscattered on a carrier wave provided by an external source.

(2) The device has a peak power consumption less than a few hundred μW and includes an energy storage. The device has an initial sampling frequency offset, SFO, of up to $10^x$ ppm. The device provides a downlink, DL, amplification and/or an uplink, UL, amplification. An UL transmission may be generated internally by the device or may be backscattered on a carrier wave provided by an external source.

A maximum communication distance of such devices, when being deployed indoors, is between 10 m and 50 m. Different topologies are supported, e.g., topology 1 and/or topology 2. In detail, topology 1 refers to a direct communication between the reader and the device, while topology 2 involves the use of an intermediate node. In the latter, a user equipment, UE, may be provided in such topologies as an intermediate note which is under control of the 3GPP network for supporting the IoT devices with low complexity and low power consumption which may have no Radio Resource Control, RRC, states, provide for no mobility support, i.e., do not support any cell selection and/or cell reselection functions, and do not have any feedback capabilities, like hybrid acknowledge request, HHARQ, and/or acknowledge request, ARQ, capabilities.

Like in RFID systems, also in the above-described IoT systems, each IoT device is assigned with a unique identifier, ID, and/or a group-ID for allowing the identification and tracking of a single IoT device or of a set of IoT devices.

The above-described RFID systems and IoT systems focus on an individual tag identification using, for example, a unique identifier or individual tag identification, which may be used for single devices or for a group of devices. However, such systems are not capable to handle scenarios in which the devices belong to different groups simultaneously.

For instance, a supply chain item may belong to multiple groups depending on different aspects, like product type (e.g., fragile, electronic, perishable), storage requirements (e.g., refrigerated, climate-controlled), and shipment details (e.g., batch number, shipping method). In such a context, conventional RFID/IoT systems which support single tag/single group operations, lack mechanisms for managing overlapping group memberships. Such limitations hinder an efficient management and tracking across multiple functional categories leading to multiple constraints. For example, the rigid structure of single group-ID indications reduces the system flexibility and makes it difficult to adapt to changing environments where items or individuals frequently shift between different groups. Also the lacking capacity to manage overlapping groups makes resource allocation and tracking cumbersome and difficult and leads to undesired delays.

Further, conventional systems do not inherently support the requirements for a group reconfiguration responsive to changing operational needs which, in turn, restricts the ability of conventional systems to adapt to real-time conditions, such as fluctuating inventory levels, varying environment conditions or shifting operational properties. Also the lack of mechanisms for managing group-specific commands and responses increases a complexity in applications that require dynamic grouping.

It is noted that the information in the above section is only for enhancing the understanding of the background of the present invention and, therefore, it may contain information that does not form conventional technology that is already known to a person of ordinary skill in the art.

Starting from the above, there may a need for enhancing the access to low complexity radio devices using backscatter communication techniques for a signal transmission, for example for RFID devices or for low complexity IoT devices.

For addressing the drawbacks found in known approaches, embodiments of the present invention propose an approach for a multi-group identification in the above-described systems, e.g., in IoT systems or RFID systems. The inventive approach is advantageous as it addresses the limitations implied by the use of single IDs only, thereby enabling an enhancement in the flexibility, a more efficient resource management and an improved operational accuracy.

SUMMARY

According to an embodiment, a radio device for a wireless communication network may have: a backscatter transmitter for transmitting a signal using a backscattered signal, wherein the radio device belongs to at least one or more groups of a plurality of different device groups.

According to another embodiment, a reader device for a wireless communication network may have: a transmitter for transmitting a signal to one or more radio devices of the wireless communication network, the radio devices using a backscattered signal for a communication within the wireless communication network and wherein belonging to at least one or more groups of a plurality of different device groups, wherein the reader device is to transmit a signal which indicates at least one of the plurality of different device groups.

According to another embodiment, a method for operating a radio device for a wireless communication network may have the step of: transmitting a signal using a backscattered signal, wherein the radio device belongs to at least one or more groups of a plurality of different device groups.

The present invention provides a radio device for a wireless communication network, comprising

- a backscatter transmitter for transmitting a signal using a backscattered signal,
- wherein the radio device belongs to at least one or more groups of a plurality of different device groups.

In accordance with embodiments, the radio device belongs to two or more groups of a plurality of different device groups.

In accordance with embodiments, the radio device includes a plurality of different group identifiers, group-IDs, the group-IDs identifying the different device groups.

In accordance with embodiments, the radio device includes a radio device identifier, device-ID.

In accordance with embodiments, the radio device is to receive an incident signal which indicates at least one group of the plurality of different device groups.

In accordance with embodiments, the at least one group is indicated by including the group-ID and/or a mask for a group-ID in the incident signal.

In accordance with embodiments, the incident signal is received in a plurality of reception occasions.

In accordance with embodiments, the plurality of reception occasions are consecutive in time.

In accordance with embodiments, wherein the plurality of reception occasions are confined within a certain time window, wherein the time window may be preconfigured or configured or dynamically indicated.

In accordance with embodiments, any the radio device is to transmit a signal using the backscattered signal responsive to the incident signal.

In accordance with embodiments, the radio device is to determine whether or not the at least one group indicated by the incident signal matches one or more or all of the groups to which the radio device belongs to, wherein

- if there is a match, the radio device transmits a signal using the backscattered signal, and/or
- if there is no match, the radio device does not transmit a signal using the backscattered signal.

In accordance with embodiments, the incident signal includes a message which indicates the at least one group of the plurality of different device groups, like a paging message or a paging frame or a preamble.

In accordance with embodiments, the incident signal indicates two or more groups of the plurality of different device groups and includes

- a message indicating the two or more groups, like a paging message or a paging frame or a preamble, and/or
- a first message including a first number of the two or more groups, like a first paging message or a first paging frame or a first preamble, and a second message including a second number of the two or more groups, like a second paging message or a second paging frame or a second preamble, wherein the second message is communicated immediately following the first message or at a configured or preconfigured time after the first message.

In accordance with embodiments,

- the radio device includes a plurality of communication configurations, each of the plurality of communication configurations being associated to a group, each communication configuration including one or more communication parameters, e.g., transmission power levels, frequency bands, or time-slot allocations,
- the incident signal indicates one or more groups, and
- responsive to the incident signal indicating one or more groups to which the radio device belongs to, the radio device is to configure the communication parameters of the communication configurations, which match the one or more groups indicated in the incident signal.

In accordance with embodiments, wherein

- a group of the plurality of different device groups to which the radio device belongs to is an active group, and/or
- a group of the plurality of different device groups to which the radio device does not belong to is an inactive group.

In accordance with embodiments, responsive to the incident signal indicating one or more groups to which the radio device belongs to, the radio device is to deactivate one or more of the currently active groups and/or activate one or more currently inactive groups.

In accordance with embodiments, the radio device is to adopt one or more settings according to one or more group requirements of an activated group, e.g., adjusting communication parameters or energy thresholds.

In accordance with embodiments, responsive to the incident signal indicating one or more groups to which the radio device belongs to, the radio device is to temporarily activate and/or deactivate one or more groups matching the one or more groups indicated in the incident signal.

In accordance with embodiments, responsive to one or more configured or preconfigured events, the radio device is to temporarily activate one or more currently inactive groups and/or temporarily deactivate one or more currently active groups.

In accordance with embodiments, wherein the radio device is to

- activate the one or more currently inactive groups for a configured or preconfigured time, and deactivate the temporally activated one or more currently inactive groups, when the configured or preconfigured time lapsed, and/or
- deactivate the one or more currently active groups for a configured or preconfigured time, and activate the temporally deactivated one or more currently active groups, when the configured or preconfigured time lapsed.

In accordance with embodiments, wherein the one or more configured or preconfigured events comprise one or more of the following:

- an expiration of a configured or preconfigured timer,
- reaching a configured or preconfigured command counter,
- an activity is below or above a certain threshold, e.g. a number of activations, sensor events or data transmissions in a certain time frame,
- a change of or reaching a threshold of a sensor value or battery level, e.g. a temperature value, an accelerometer output, a gyroscope output, a sound value, a pressure value, a humidity value, an air quality, a gas, chemicals or a motion,
- an activation of an emergency or severe incident state, e.g., a deployment of an air bag, a parachute, a life raft, activation of an automated external defibrillator (AED) or first aid kit,
- a change of an operational state of the radio device, or
- a change of a state of a communication performed by the radio device.

In accordance with embodiments, the configured or preconfigured timer indicates a duration of inactivity of the radio device, e.g., a period of inactivity.

In accordance with embodiments, the timer is set responsive to

- an indication in the incident signal, or
- a specific command included in the incident signal, like a read command, or a write command, or a lock command.

In accordance with embodiments, the configured or preconfigured command counter tracks certain incidents, e.g., a number of completed inventory rounds, and, responsive the counter reaching a configured or preconfigured threshold, the radio device may

- temporarily deactivate the one or more currently active groups, or
- temporarily activate the one or more currently inactive groups.

In accordance with embodiments, the operational state of the radio device comprises one or more of the following:

- a wear of the radio device, e.g., if one or more wear parameters reach a configured or preconfigured threshold, the radio device may
  - temporarily deactivate the one or more currently active groups, or
  - temporarily activate a group identifying a device group allowing a performance of one or more preventative maintenance procedures,
- an energy condition of the radio device, e.g., responsive to a poor signal quality, a potential loss of connectivity, or a battery state falling short of a configured or preconfigured threshold, the radio device may
  - temporarily deactivate the one or more currently active groups, or
  - temporarily activate a group identifying a device group allowing to conserve energy,
- an energy harvesting condition, e.g., responsive to an amount of energy obtained by energy harvesting falls short of a configured or preconfigured threshold, the radio device may
  - temporarily deactivate the one or more currently active groups, or
  - temporarily activate a group identifying a device group allowing to conserve energy and/or a low-power operation,
- certain data to be transmitted, e.g., responsive to an increase in an amount of data to be transmitted exceeding a configured or preconfigured threshold, the radio device may
  - temporarily deactivate the one or more currently active groups, or
  - temporarily activate a group associated with higher transmission periodicity and/or transmission priority.
- a sensor value above or below a certain threshold, e.g. a temperature sensor exceeding a predefined threshold or an accelerometer detecting a high acceleration.

In accordance with embodiments, the state of the communication performed by the radio device comprises one or more of the following:

- a number of consecutive packet failures, e.g., if a number of consecutive packets not successfully received or transmitted reaches a configured or preconfigured threshold, the radio device may
  - temporarily deactivate the one or more currently active groups, or
  - temporarily activate a group identifying a device group for inactive or low-activity devices.
- a change in a signal strength, e.g., if the radio signal strength drops below a certain threshold the radio device may,
  - temporarily deactivate the one or more currently active groups, or
  - temporarily activate a group associated with more robust communication parameters, e.g., lower coding rates for more robust error correction,
- a channel access delay exceeding a configured or preconfigured threshold, e.g., if the time or number of attempts taken to access the channel exceeds a preconfigured threshold, the radio device may,
  - temporarily deactivate the one or more currently active groups, or
  - temporarily activate e.g. a group associated with non-time sensitive tasks.

a channel busy ratio is exceeding or is below a configured or preconfigured threshold, the radio device may,
temporarily deactivate the one or more currently active groups, or
temporarily activate a group e.g. associated with non-time sensitive tasks.
a channel interference e.g., if the interference exceeds a certain threshold the radio device may,
temporarily deactivate the one or more currently active groups, or
temporarily activate a group associated with more robust communication parameters, e.g., lower coding rates for more robust error correction,
a change in carrier wave, CW, e.g. if the type or frequency of a carrier wave changes, the radio device may,
temporarily deactivate the one or more currently active groups, or
temporarily activate one or more groups.

In accordance with embodiments, wherein
the different device groups comprise a plurality of device groups, each of the plurality of device groups associated with a certain operational state of the radio device,
the radio device includes an active group, and/or one or more inactive groups, and
the radio device is to deactivate the active groups and/or activate one of the currently inactive groups, thereby indicating the certain operational state of the radio device.

In accordance with embodiments, the operational state of the radio device comprises one or more of the following:
an energy condition of the radio device, e.g., responsive to an available energy at the radio device reaching a certain energy level, the radio device may activate a device group associated with the certain energy level,
a power-saving mode, e.g., when the device enters a power-saving state, like a sleep state, after a period of inactivity, it may deactivate or activate certain groups,
a signal strength, e.g., responsive to the signal strength the device may activate or deactivate certain groups.

In accordance with embodiments, a device group associated with the certain energy level has assigned a certain duration of sleep cycles or duty cycles, and one device group has assigned shorter sleep cycles or duty cycles than another device group.

In accordance with embodiments, the different device groups comprise a plurality of device groups, each of the plurality of device groups associated with one or more certain channel access parameters when performing a certain operation, like an inventory round, e.g., a Q-value, a maximum number of retransmissions and/or contention window size.

In accordance with embodiments, each of the plurality of device groups is further associated with a priority, and wherein the one or more certain channel access parameters of a device group of a first priority are superior to the one or more certain channel access parameters of a device group of a second priority which is lower than the first priority.

In accordance with embodiments, a higher priority is associated with a shorter channel access time, e.g., by selecting a shorter random access counter.

In accordance with embodiments, if the radio device belongs to two or more of the plurality of device groups, the radio device is to apply the one or more certain channel access parameters associated with the device group having the highest or lowest priority.

In accordance with embodiments, if the radio device belongs to two or more of the plurality of device groups, the radio device is to combine the one or more certain channel access parameters associated with the device groups using, e.g., a weighted average approach.

In accordance with embodiments, the weights are be based on
the priorities levels of two or more of the plurality of device groups, or
other predefined criteria.

In accordance with embodiments, if the radio device belongs to two or more of the plurality of device groups, the radio device is to attempt a channel access using the one or more certain channel access parameters associated with the device groups in sequence, e.g., stating with the one or more certain channel access parameters associated with the device group having the highest or lowest priority.

In accordance with embodiments, the radio device is to receive an incident signal which indicates, in addition to the at least one group, a system configuration for one or more or all of the at least one groups indicated by the incident signal.

In accordance with embodiments, the system configuration comprises one or more of the following:
channel access parameters, including priority levels, frequency offset and/or access cycles,
A duty cycle, e.g. DRX or sleep cycles,
security settings, including encryption and/or authentication.

In accordance with embodiments,
the radio device includes a configured or preconfigured mask to receive the system information specific to device groups the radio device belongs to, or
a mask is associated with the group, enabling the system information specific to device groups the radio device belongs to.

In accordance with embodiments, the radio device is to receive an incident signal which indicates, one or more transmit parameters for a backscattered signal transmission, e.g., for D2R scheduling.

In accordance with embodiments, the one or more transmit parameters comprise one or more of the following:
time domain resources, e.g. a time window or time offset,
frequency domain resources, e.g. a frequency range or a frequency shift,
code domain resources, e.g. CDMA or orthogonal preamble selection,
MCS-like information, like a code rate, a modulation, repetitions,
Chip duration,
ID(s) associated with device(s), like a device ID or a group ID,
repetitions of the transmissions in case of an unsuccessful first transmission.

In accordance with embodiments, the different device groups comprise one or more of the following:
one or more device groups including one or more radio devices having one or more certain communication properties,
one or more device groups including one or more radio devices having one or more certain device properties,
one or more device groups including one or more radio devices in a certain state,
one or more device groups including one or more radio devices used for one or more certain applications,
one or more device groups to which radio devices are assigned randomly.

In accordance with embodiments, a device group including one or more radio devices having one or more certain communication properties includes radio devices having one or more of the following:

- the same latency requirements for a radio communication,
- a difference in latency requirements for a radio communication which is at or below a predefined difference threshold,
- latency requirements for a radio communication which are within a predefined latency range,
- the same distances from a reader device, e.g., the same Euclidean distance,
- a difference in distances from a reader device, e.g., the Euclidean distance, which is at or below a predefined difference threshold,
- distances from a reader device, e.g., the Euclidean distance, which are within a predefined distance range,
- the same channel characteristics for a radio communication, e.g. a pathloss or a line of sight probability,
- a difference in channel characteristics for a radio communication which is at or below a predefined difference threshold,
- channel characteristics for a radio communication which are within a predefined channel characteristic range.

In accordance with embodiments, a device group including one or more radio devices having one or more certain device properties includes radio devices having one or more of the following:

- the same manufacturer or vendor,
- the same or compatible frequency band capabilities,
- the same country code or region code or place of manufacturing,
- the one or more same sensors or actuators,
- being part of the same larger device group, e.g., within the same product, like a complex machinery,
- a certain device type, e.g., passive, semi-passive, active,
- a certain power class, e.g., a peak power consumption of about 1 μW or a peak power consumption of less than a few hundred μW.

In accordance with embodiments, a device group including one or more radio devices in a certain state includes radio devices having one or more of the following:

- an age below or above one or more predefined age thresholds,
- a number of times they have been addressed or triggered below or above one or more predefined trigger thresholds,
- the same battery power state,
- a difference in battery power state which is at or below a predefined difference threshold,
- battery power states which are within a predefined battery power state range.

In accordance with embodiments, a device group including one or more radio devices used for one or more certain applications includes radio devices according to one or more of the following:

- radio devices for the same or a similar service or application type, e.g., logistic applications or sensing applications,
- radio devices attached to the same products, e.g., products having the same product ID,
- radio devices having a certain functionality, e.g., a capability to actively amplify and/or forward data.

In accordance with embodiments, the radio device comprise one the following:

- an IoT Internet-of-Things, IoT, device,
- an NB-IoT or eMTC device,
- a low power wide area device, LPWA,
- an Ambient IoT device,
- a sensor device,
- an actuator device,
- an Radio-frequency identification, RFID, device, like an RFID tag,
- a mobile terminal of a wireless communication network, e.g., a user equipment, UE, of a 3GPP network or of a WiFi network.

In accordance with embodiments, the wireless communication network comprise one the following:

- a 3GPP network, e.g. LTE, NR, 6G
- a WiFi network, STA,
- non-terrestrial network, satellite network,
- an RFID network.

The present invention provides a reader device for a wireless communication network, comprising

- a transmitter for transmitting a signal to one or more radio devices of the wireless communication network, the radio devices using a backscattered signal for a communication within the wireless communication network and wherein belonging to at least one or more groups of a plurality of different device groups,
- wherein the reader device is to transmit a signal which indicates at least one of the plurality of different device groups.

In accordance with embodiments, the one or more radio devices comprise a radio device according to embodiments of the present invention.

In accordance with embodiments, the signal further includes one or more radio device identifiers, device-IDs, of the one or more radio devices.

In accordance with embodiments, the signal includes a message indicating the at least one group of the plurality of different device groups, like a paging message or a paging frame or a preamble.

In accordance with embodiments,

- the signal indicates two or more groups of the plurality of different device groups and includes
  - a message including the two or more groups, like a paging message or a paging frame or a preamble, or
  - a first message including a first number of the two or more groups, like a first paging message or a first paging frame or a first preamble, and a second message including a second number of the two or more groups, like a second paging message or a second paging frame or a second preamble, and
- the reader device is to transmit the second message immediately following the first message or at a configured or preconfigured time after the first message.

In accordance with embodiments, the receiver is to transmit the signal to one or some or all radio devices of the wireless communication network which are within a communication range of the reader device.

In accordance with embodiments, for transmitting the signal to all of the radio devices of the wireless communication network, the reader device does not to include any device-ID into the signal.

In accordance with embodiments, for transmitting the signal to one or some or all of the radio devices of the wireless communication network, the reader device is to include respective device-IDs into the signal.

In accordance with embodiments, for transmitting the signal to some or all of the radio devices, the reader device is to send respective signals to two or more proper subgroups of the some or all radio devices using a predefined transmission scheme, like a Time Division Multiple Access, TDMA, mechanism, or a Spatial Division Multiple Access, SDMA, mechanism, or a Frequency Division Multiple Access, FDMA, mechanism, or a Code Division Multiple Access, CDMA, mechanism.

In accordance with embodiments, for each transmission instance of the predefined transmission scheme, the reader device is to choose a certain number of radio devices, e.g., a random number, to transmit to during the transmission instance.

In accordance with embodiments, the signal indicates one or more communication parameters for one or more communication configurations of a radio device, which is associated a device-ID included in the signal, and an indication to update currently used communication parameters, the communication configuration being identified by the group included in the signal.

In accordance with embodiments,
- a group of the plurality of different device groups to which the radio device belongs to is an active group, and
- a group of the plurality of different device groups to which the radio device does not belong to is an inactive group.

In accordance with embodiments, the signal includes an indication causing a radio device to deactivate one or more of the currently active groups and/or activate currently inactive groups.

In accordance with embodiments, the reader device is to receive from a radio device an indication of at least the one or more device groups to which the radio device belongs, e.g., by receiving group-IDs of active groups.

In accordance with embodiments, responsive to receiving an indication of one or more active group, the reader device is to determine an operational state the radio device, e.g., a power state.

In accordance with embodiments, the reader is to retrieve or set a system configuration for one or more or all of the active groups for one or more of the radio devices, e.g., by using read and write commands.

In accordance with embodiments, the signal includes, in addition to the at least one group, a read command for retrieving the one or more system configurations, or a read command and payload data indicating the one or more system configurations.

In accordance with embodiments, the signal indicates, in addition to the at least one group, one or more transmit parameters for a backscattered signal transmission by one or more of the radio signals, e.g., for D2R scheduling.

In accordance with embodiments, the one or more transmit parameters comprise one or more of the following:
- time domain resources,
- frequency domain resources,
- MCS-like information, like a code rate, a modulation, repetitions,
- Chip duration,
- ID(s) associated with device(s), like a device ID or a group ID,
- repetitions of the transmissions in case of an unsuccessful first transmission.

In accordance with embodiments, the reader device acts as an intermediate node, like a relay node or a gateway node, between the one or more radio devices and an entity of the wireless communication system, when the entity of the wireless communication system is not capable of communicating directly with the one or more radio devices.

In accordance with embodiments, the reader device is to translate certain parameters, like the group-ID or the device-ID, into parameters of the wireless communication system, like an International Mobile Subscriber Identity, IMSI or a Temporary Mobile Subscriber Identity, TMSI.

In accordance with embodiments, the reader device comprise one the following:
- an IoT Internet-of-Things, IoT, device,
- an Ambient IoT device,
- an Radio-frequency identification, RFID, device, like an RFID reader,
- a mobile terminal of a wireless communication network, e.g., a user equipment, UE, of a 3GPP network or of a WiFi network,
- a radio access network, RAN, entity of a wireless communication network, e.g., a base station of a 3GPP network or of a WiFi network.

The present invention provides a wireless communication network, comprising:
- one or more radio devices according to embodiments of the present invention, or
- one or more radio devices according to embodiments of the present invention and one or more reader devices according to embodiments of the present invention.

The present invention provides a method for operating a radio device for a wireless communication network, the method comprising
- transmitting a signal using a backscattered signal,
- wherein the radio device belongs to at least one or more groups of a plurality of different device groups.

The present invention provides a method for operating a reader device for a wireless communication network, comprising
- transmitting a signal to one or more radio devices of the wireless communication network, the radio devices using a backscattered signal for a communication within the wireless communication network and wherein belonging to at least one or more groups of a plurality of different device groups,
- wherein the signal which at least one of the plurality of different device groups.

Embodiments provide a computer program product comprising instructions which, when the program is executed by a computer, causes the computer to carry out one or more methods in accordance with the present invention.

In accordance with the inventive approach, a radio device may belong to two or more groups of a plurality of different device groups. A device group, also referred to as a cluster of devices or a category of devices, may refer to a collection of devices that are categorized or grouped together based on one or more certain criteria or one or more operational requirements. For example, radio devices, like IoT devices, within the same group or cluster or category may share similar functionalities or roles so that they may be managed collectively. There is no need that the devices actually know the group which they belong to or whether other devices are part of the same group. In accordance with embodiments, the devices are provided with respective group-IDs which may be stored in a suitable storage of the devices, however, the devices need not to be aware of how and why they have been grouped. A group ID may be a integer identifying a group, a device type or an attribute (e.g., sensor device, manufacturer, product type). A group ID may also come in the form of a group mask. That means only certain parts of the ID are fixed and the remaining parts are variable. For example, in binary representation the ID 1000 and the mask 1100 may also define a group ID. The mask may define significant and insignificant bit positions. For example, 1 may represent a significant and 0 may represent an insignificant bit position. In an alternative representation, the same group mask may be defined as 10xx, where the x represents the insignificant bit positions. Using this group mask as a group ID, the device may determine whether it is part of this group by matching its device ID or any other group ID to the group mask. That means it may compare only the significant parts of the group mask to its device ID or group IDs to determine a match. For example, assuming a device has a device ID of 1011, the device would be part of the group defined by the mask 10xx. Also, device with the device ID 1010 would be part of the group defined by the mask 10xx. However, a device with device ID 1111 would not be part of the group defined by the mask 10xx but it would be part of a group defined by the group mask 11xx.

Considering, for example, the electronic product code, EPC, number which is widely used for RFID tags for identifying and categorizing products, the EPC may also be used for IoT devices. Although the EPC offers a high level of granularity, with a dedicated object class field of up to 26 bits allowing for the creation of multiple product groups, the potential provided by the EPC is not fully available in conventional networks, like conventional RFID networks or IoT networks. The reason is that the respective readers are designed to send only a single group indication towards the respective radio devices or radio tags, i.e., there is no ability to communicate with multiple groups or subgroups of radio devices simultaneously. For example, in a warehouse setting, if an IoT reader or an RFID reader needs to communicate with a group of radio devices or tags, like RFID tags or IoT tags, that are, for example, attached to products being both temperature-sensitive and being part of a specific shipment, conventionally the readers have to choose which group to address first. If the temperature-sensitive group is prioritized, then the tags associated with the specific shipment do not immediately receive the necessary instructions for handling or relocation. Such delays may lead to inefficiencies, thereby effecting the overall system efficiency. Embodiments of the present invention as defined in the above claims, overcome such limitations by introducing the use of a multi-group identification in RFID systems and IoT systems.

BRIEF DESCRIPTION OF THE DRAWINGS

Embodiments of the present invention are now described in further detail with reference to the accompanying drawings, in which.

DETAILED DESCRIPTION OF THE DRAWINGS

In the following description of embodiments of the present invention, in the accompanying drawings the same or similar elements have assigned the same reference signs.

Figure 1:
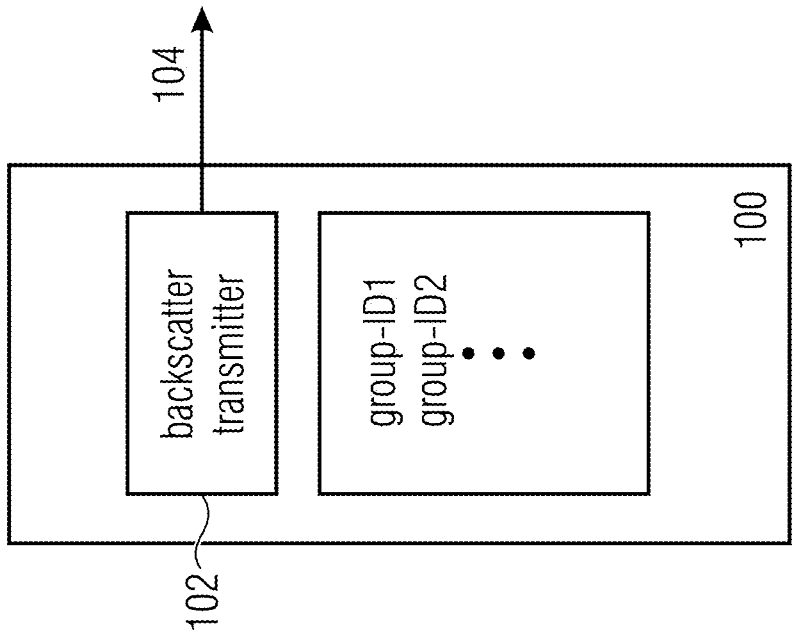
FIG. 1 illustrates a radio device in accordance with embodiments of the present invention.

FIG. 1 illustrates a radio device 100 in accordance with embodiments of the present invention. The radio device 100 may be part of a wireless communication network and comprises a backscatter transmitter 102 for transmitting a signal 104 using a backscattered signal. The radio device 100 belongs to two or more groups of a plurality of different device groups. The radio device may include a plurality of different group identifiers group-ID1, group-2, . . . . The group-IDs identify the two or more groups of different device groups to which the radio device 100 belongs to. In accordance with embodiments, the radio device 100 may be an ultra-low complexity IoT device having an ultra-low power consumption in accordance with the 3GPP standards. In accordance with other embodiments, the radio device 100 may be a device operating in accordance with the WiFi standards. In accordance with yet other embodiments, the radio device 100 may be an RFID device, like an RFID tag.

Figure 2:
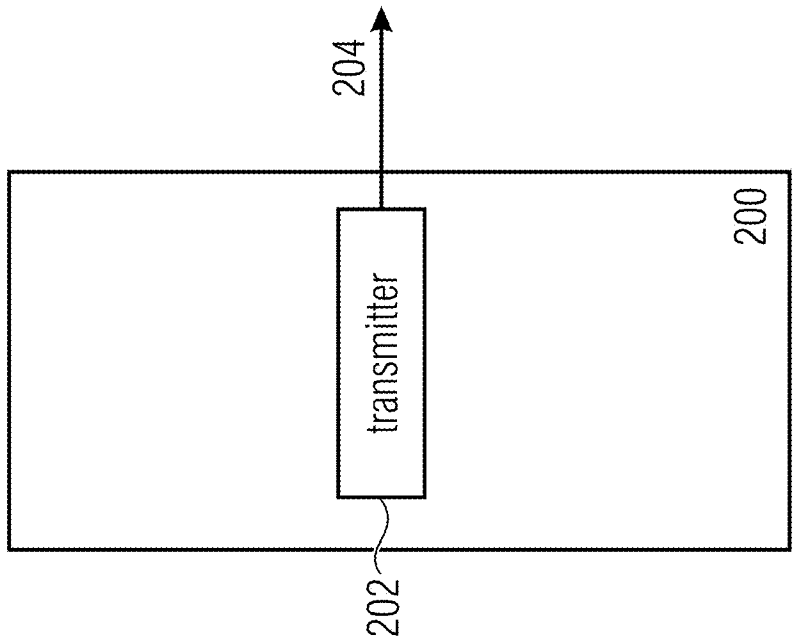
FIG. 2 illustrates a reader device 200 in accordance with embodiments of the present invention.

FIG. 2 illustrates a reader device 200 in accordance with embodiments of the present invention. The reader device 200 may be part of a wireless communication network and comprises a transmitter 202 for transmitting a signal 204 to one or more radio devices of the wireless communication network. The radio devices of the communication network may be radio devices as described above with reference to FIG. 1, i.e., radio devices using a backscattered signal for a communication within the wireless communication network and belonging to the two or more groups of a plurality of different device groups. The reader device 200 transmits the signal 204 which indicates at least one of the plurality of different device groups.

In accordance with embodiments, the reader device 200 may be a network entity of a 3GPP wireless communication network, for example a user equipment, UE, or a base station, BS, or any other radio access network, RAN, entity of the network. In accordance with other embodiments, the radio device may be a station, STA, or access point, AP, of a WiFi network. In accordance with yet other embodiments, the radio device 200 may be an RFID-reader.

Figure 3:
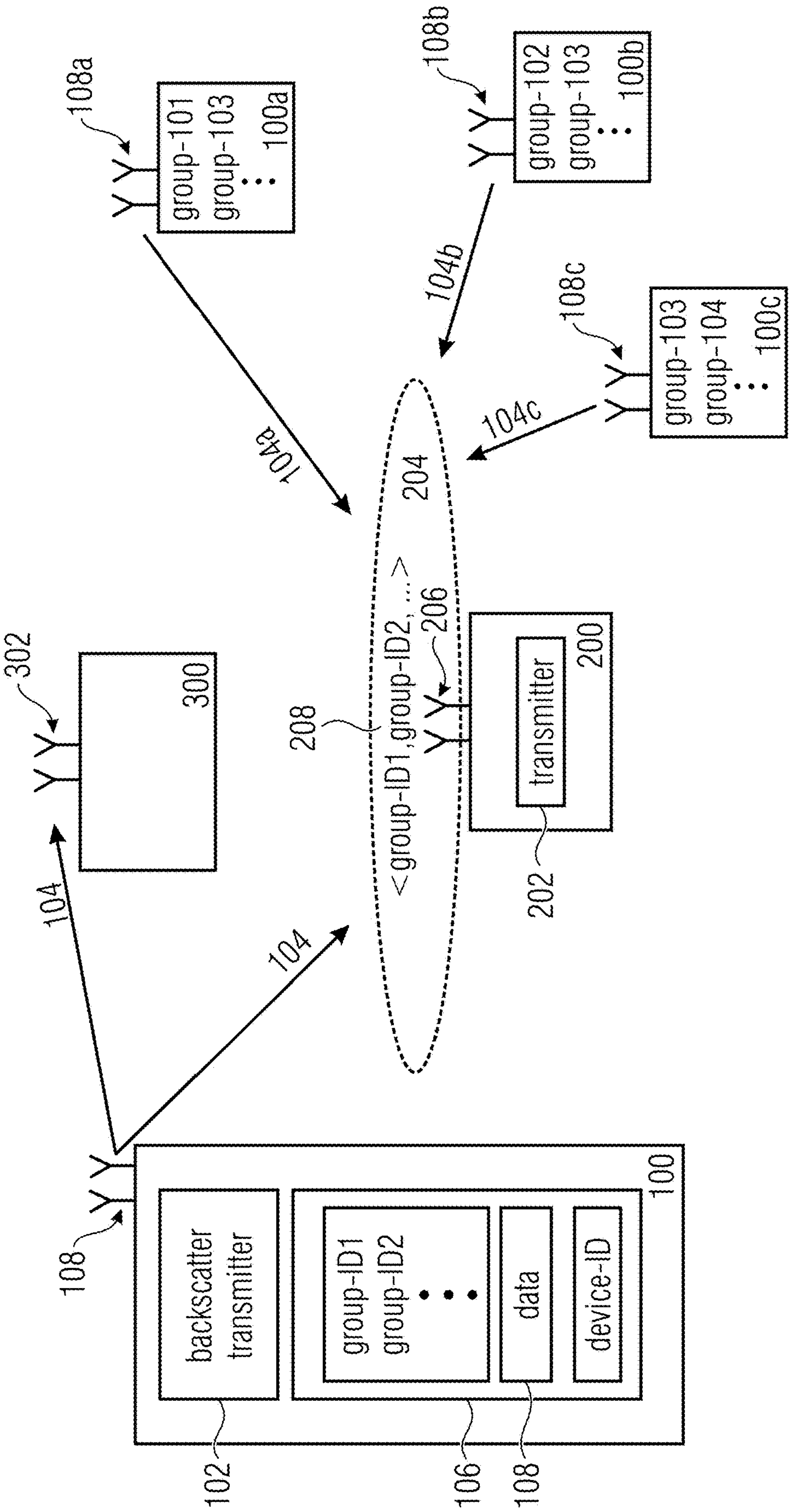
FIG. 3 illustrates a wireless communication system in accordance with embodiments of the present invention.

FIG. 3 illustrates a wireless communication system in accordance with embodiments of the present invention. The wireless communication system comprises a radio device 100, like the radio device of FIG. 1, e.g., an IoT device, an Ambient IoT device, a WiFi device or an RFID device, using backscattering for a data transmission and being associated with two or more groups. The radio device 100 comprises the backscatter transmitter 102 for transmitting the signal 104, like a data signal, also referred to as a reflected or backscattered signal. The radio device 100 includes the plurality of different group identifiers group-ID1, group-ID2, . . . , which identify the groups of different device groups to which the radio device 100 belongs. In accordance with embodiments, the group-IDs may be stored in a memory 106 of the radio device 100. The radio device 100 may receive, for example via one or more antennas 108 or an antenna array having one or more antenna elements, a radiation signal from a signal source. The radiation signal is also referred to as an incident signal or an excitation signal, and the backscatter transmitter 102 conveys information, like data 108 stored in the memory 106 of the radio device 100 by remodulating and reflecting the signal from the signal source.

In accordance with further embodiments, the radio device 100 may also include an identification like a device-ID, which may also be stored in the memory 106.

In accordance with yet further embodiments, the radio device 100 may include additional transmitter and/or receiver circuitry for a communication in accordance with the communication protocol of the wireless communication network, like the 3GPP network or the WiFi network.

The wireless communication system includes a reader device 200, like the reader device of FIG. 2, e.g., a 3GPP device, like a UE or a BS, a WiFi device, like a STA or an AP, or an RFID reader. The reader device 200 is the above mentioned signal source providing the incident signal. The reader device 200 includes one or more antennas 206 or an antenna array having one or more antenna elements for transmitting the signal 204 and for receiving backscattered signals 104 from one more of the radio devices being within communication range of the reader device 200. The reader device 200 transmits the signal 204 which indicates at least one of the plurality of different device groups. As is illustrated in FIG. 3, in the depicted embodiment the reader device 200 indicates in the signal 204 the groups are identified by group-ID1 and group-ID2. The signal 204 may be a trigger signal or a paging signal, and a preamble of the a signal includes the multiple groups using the group-IDs. By means of the trigger/paging signal 204, the reader device 200 causes the radio devices, which belong to either of the two groups identified by group-ID1 and group-ID2 to wake up. The radio devices within a certain group may share common characteristics, such as similar latency requirements regarding a transmission of the data 104, or a certain proximity, for example each other or to another device or object in the environment in which the wireless communication system is implemented, or a similar triggering frequency. This allows the radio devices belonging to this group to be handled or managed collectively. Also, radio devices within a certain group may be associated with products having certain requirements, for example radio devices associated with products being temperature-sensitive may grouped into a first group while radio devices associated with products requiring an urgent delivery may be grouped into a second group. In accordance with the inventive approach, the reader 200 transmits the signal 204 including, e.g., a paging message 208 which, by including the respective group-IDs, is now directed to both the temperature-sensitive and urgent delivery groups, i.e., all radio devices belonging to one or both of the temperature-sensitive and urgent delivery groups may be scheduled to be activated during the same inventory round.

Thus, other than in known approaches which require in such a situation at least two inventory rounds, the inventive approach is advantageous as it shortens the period for activating the desired radio devices due the possibility to schedule or activate all devices during a single inventory round thereby increasing the system flexibility and effectiveness. For example, upon receiving the paging signal 204, the radio devices from either group, namely from group 1 and group 2 (group-ID1 and group-ID2) may wake up and proceed to decode any subsequently transmitted physical reader to device channel, PRDCH.

The wireless communication system may include a plurality of radio devices within the communication range of the reader device, e.g., in addition to radio device 100, further devices 100*a*, 100*b* and 100*c* may be provided, which are radio devices as described with reference to FIG. 1. Like radio device 100, also the further radio devices 100*a*, 100*b* and 100*c* belong to two or more groups of a plurality of different device groups include a plurality of different group-IDs, which identify the two or more groups of different device groups to which the further radio devices may belong. In the depicted embodiment, the further radio device 100*a* belongs to group 1 and group 3 identified by group-ID1 and group-ID3, respectively, the further radio device 100*b* belongs to group 2 and group 3 identified by group-ID2 and group-ID3, respectively, and the further radio device 100*c* belongs to group 3 and group 4 identified by group-ID3 and group-ID4, respectively. The further radio devices 100*a* to 100*c* include one or more antennas 108*a*, 108*b*, 108*c* or respective antenna arrays including one or more antenna elements for receiving the signal 204 transmitted by the reader device 200 and for transmitting either to the reader device 200 or to a further device 300. The further network entity 300 includes one or more antennas 302 or an antenna array having one or more antenna elements for receiving the backscattered signals for one or more of the radio devices 100*a* to 100*c* as well as from radio device 100.

The radio devices 100 and 100*a* to 100*c*, when receiving the signal 204, determine whether they belong to one or more of the groups indicated in the signal. For example, they determine whether one or more of the group-IDs included in the respective reader devices match one or more of the group-IDs included in the signal 204. If a reader device determines that one or more of the group-IDs included in its memory match one or more of the group-IDs in the signal 204, the reader device perform or more operations, for example the reader may initiate a data transmission, update its communications parameters, or trigger its sensor reading from the matched group. On the other hand, when determining no match between any of its group-IDs and any of the group-IDs included in the signal 204, meaning that a radio device is not addressed by the reader device 200, the radio device is not triggered to perform a certain operation.

In the depicted embodiment, the reader device 200 sends in the incident signal 204 group-ID1 and group-ID2 so that all radio devices belonging to the different device groups identified by group-ID1 and group-ID2, are addressed by a single signal. Radio devices 100, 100*a* and 100*b* are addressed by the signal 204 as each of the radio devices includes at least one of group-ID1 and group-ID2. However, radio device 100*c* including group ID-3 and group ID-4 is not addressed since it does not include any of the group IDs included in the signal 204.

In a further embodiment, the reader device 200 sends the incident signal 204 in multiple transmissions, wherein the transmissions occur within a certain time window. For example, the first transmission of a first part of the incident signal indicates group-ID1 and a second transmission of a second part of the incident signal indicates group-ID2.

However, none of the radio devices 100, 100*a* and 100*b* are addressed by the signal 204 because none of them includes both group-IDs.

When considering the above example of a warehouse setting, it is assumed that the group identified by group-ID1 refers to radio devices attached to products which are temperature-sensitive while the group identified by group-ID2 is assumed to be associated with radio devices attached to products requiring a specific shipment. Thus, the radio device 100 is associated with a product being temperature-sensitive and requiring a specific shipment, the radio device 100*a* is associated with a product being temperature-sensitive, and the radio device 100*b* being associated with a product requiring the specific shipment. By using for the respective radio devices the multiple groups and by using the signal 204 which includes group-ID1 and group-ID2, all of the radio devices 100, 100*a* and 100*b* are addressed.

Thus, other than in conventional approaches, in accordance with the embodiment described with reference to FIG. 3 all desired radio devices, like IoT devices or RFID tags, may be addressed simultaneously and, if desired additional data, for example handling instructions or the like, may be provided simultaneously to the respective radio devices via the signal 204.

The system of FIG. 3 may be a monostatic backscatter communication system or a bi-static backscatter communication system. In case of a monostatic backscatter communication system, the radio device 100 transmits the backscattered signal 104 to the excitation source or reader device 200 while in a bi-static backscatter communication system the backscattered signal 104 is transmitted towards another backscatter receiver separate from the transmitter (reader device 200), e.g., to the further device 300.

In the embodiment of FIG. 3, the desired groups are indicated within the signal 204, e.g., within a preamble of one message 208, like a trigger or paging message. In accordance with other embodiments, the reader device 200 may identify or indicate the groups in a subsequent manner, for example, by transmitting a first preamble or paging frame indicating the first group-ID and a second preamble or paging frame indicating the second group-ID, with the second preamble or paging frame immediately following the first preamble or paging frame or following the first preamble or paging frame with a configured or preconfigured time offset which has a duration so as to allow the activation of the radio devices associated with the two groups during the same inventory round.

In accordance with embodiments of the present invention, the radio devices 100 to 100*c* may be associated with the different device groups dependent on one or more the following: communication properties, one or more device properties, a device state, a use for one or more certain applications. In other words, the different device groups may comprise: one or more device groups including one or more radio devices having one or more certain communication properties, and/or one or more device groups including one or more radio devices having one or more device properties, and/or one or more device groups including one or more radio devices in a certain state, and/or one or more device groups including one or more radio devices used for one or more applications. In accordance with embodiments a group may consist of a single device. In accordance with yet other embodiments, radio devices may also be assigned to groups randomly (fifth device groups). The random assignment may be used to coordinate large inventory rounds by batching them into random sub groups.

A device group including one or more radio devices having one or more certain communication properties may include radio devices having one or more of the following:

- The same latency requirements for a radio communication.
- A difference in latency requirements for a radio communication which is at or below a predefined difference threshold.
- Latency requirements for a radio communication which are within a predefined latency range.
- The same distances from a reader device, e.g., the same Euclidean distance.
- A difference in distances from a reader device, e.g., the Euclidean distance, which is at or below a predefined difference threshold.
- Distances from a reader device, e.g., the Euclidean distance, which are within a predefined distance range.
- The same channel characteristics for a radio communication, e.g. a pathloss or a line of sight probability.
- A difference in channel characteristics for a radio communication which is at or below a predefined difference threshold.
- Channel characteristics for a radio communication which are within a predefined channel characteristic range.

A device group including one or more radio devices having one or more device properties may include radio devices having one or more of the following:

- The same manufacturer or vendor.
- A certain device type, e.g., passive, semi-passive, active.
- A certain power class, e.g., a peak power consumption of about 1 μW or a peak power consumption of less than a few hundred μW.

A device group including one or more radio devices in a certain state may include radio devices having one or more of the following:

- An age below or above one or more predefined age thresholds.
- For example, radio devices may be grouped dependent on their age so that radio devices having a certain age or being within a certain range of ages are included in one group. This is advantageous as older radio devices may have a power budget that is worse than the power budget of younger radio devices. This may result, for example, from the aging of a battery or the aging of hardware components of the radio device. Due to the reduced power budget, older devices may require less triggering so that when grouping the radio devices according to their age, the reader device is capable of controlling the activation or triggering of certain devices dependent on their age so that older devices are less frequently triggered or activated. This reduces power consumption, which extends device lifespan, and mitigates the risk of timing errors from aging components such as oscillators. In other words, timing accuracy may degrade with aging components, like clocks or oscillators so reduced triggering decreases the odds of having higher timing errors.
- A number of times they have been addressed or triggered below or above one or more predefined trigger thresholds.
- For example, radio devices may be grouped dependent on the number of times they were triggered within a given time period. This may result, for example, in devices that have been classified into high-activity group to trigger a maintenance procedure earlier than those grouped into low-activity.

An inactivity period being below or above one or more predefined trigger thresholds.

For example, radio devices may be grouped dependent on the duration of a sleep period or an inactive period. The reader device may deactivate devices that have a longer inactivity intervals for a certain period of time.

The same battery power state.

A difference in battery power state which is at or below a predefined difference threshold.

Battery power states which are within a predefined battery power state range,

A device group including one or more radio devices used for one or more applications may include radio devices according to one or more of the following:

Radio devices for the same or a similar service or application type, e.g., logistic applications or sensing applications.

Radio devices attached to the same products, e.g., products having the same product ID.

For example, the radio devices may be grouped dependent on a product which they are attached to, for example dependent on a product ID. For instance, a radio device may be built into or attached to another device, for example to a part of a more complex component like a car or a car component.

Radio devices having a certain functionality, e.g., a capability to actively amplify and/or forward data.

For example, devices equipped with signal amplification capabilities may be grouped together. These devices may actively enhance weak signals received from distant transmitters, and therefore, they may be suitable for longer communication ranges.

In accordance with other embodiments, a situation is addressed that a device group contains a large number of radio devices. For example, a device group associated with group-ID1 may include a large number of radio devices, for example thousands of radio devices. In accordance with embodiments, only one or some of these radio devices are addressed within a given time interval, i.e., within the device group only a sub-group of the radio devices may be addressed. This may be used in case of radio devices transmitting data. When the reader device 200 wakes up all the radio devices a high number of responses is to be expected which need to be coordinated. In such a situation the reader device 200 may employ a certain transmission mechanism so that at the respective transmission instances of the selected mechanism, only a subset of the radio devices within the device group is actually addressed.

For example, the transmission mechanisms may include a time division multiple access, TDMA mechanism, or a spatial division multiple access, SDMA, mechanism, or a frequency division multiple access, FDMA, mechanism, or a code division multiple access, CDMA, mechanism. Considering, the TDMA mechanism, the reader device 200 may address the radio devices in a TDMA-fashion by choosing, for example, a randomized set of radio devices to be in the sub-group at a time instance k, whereas another set of radio devices is addressed at a different time instance m, with $k \neq m$. In addition, with regard to the respective transmission instances further constraints may be applied, for example in the TDMA case a minimum time gap between the time instances k and m may be defined. In the same way, when using the SDMA mechanism different sub-groups may be transmitted into different directions, when using the FDMA mechanism different sub-groups may be transmitted at different frequencies, and when using the CDMA mechanism different sub-groups may be transmitted using different codes. Also here certain constraints may optionally be applied, like a certain difference of the directions, frequencies and codes.

Figure 4:
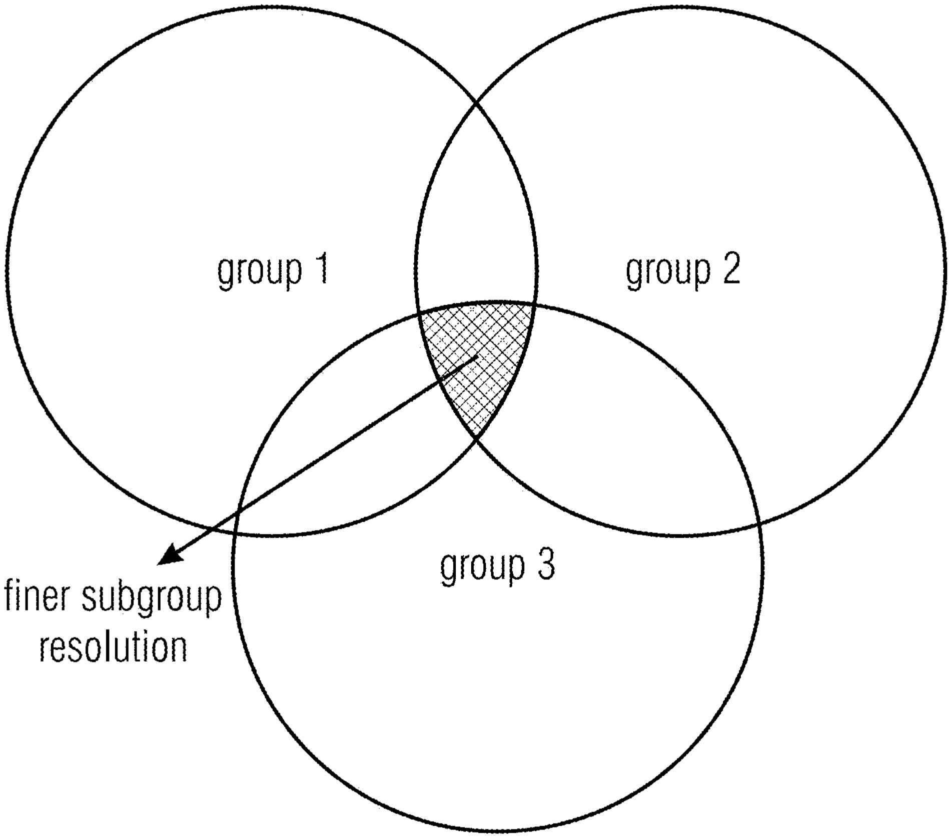
FIG. 4 illustrates the use of multiple groups for providing for a finer resolution in accordance with embodiments of the present invention.

As described above, in accordance with the present invention, the incident or excitation signal 204 provided by the reader device 200 may indicate at least one group or group-ID. However, in accordance with other embodiments, the signal 204 may also indicate multiple groups or group-IDs so as to wake up only an intersection of radio devices belonging to the groups in the signal 204. This embodiment is advantageous as it allows for a more granular selection of radio devices, as is also depicted in FIG. 4 illustrating the use of multiple groups for providing for a finer resolution. This allows a targeted communication with a highly specific subset of radio devices, like RFID or IoT nodes. For example, if the reader device 200 sends a paging frame 208 indicating group 1, group 2 and group 3, only those radio devices that are associated with these groups or categories assigned to these groups, responsive to the signal 204, may proceed with a decoding of a subsequent PRDCH provided by the reader device 200.

In a further embodiment, the incident or excitation signal 204 is provided in multiple parts. Each part of the incident signal 204 may be transmitted at different times and each may indicate one or more groups or group-IDs. So as to enable a more granular selection of radio devices, as depicted in FIG. 4, the devices may determine a plurality of parts of an incident signal as a certain incident signal, wherein each part indicates one or more groups or group-IDs and the union of all indicated groups or group-IDs is determined as a set of groups or group-IDs that is used to target only those devices that are associated with all group or group-IDs of the set of groups or group-IDs. In a further embodiment, a device may determine multiple parts of an incident signal as a certain incident signal only if the parts are received within a certain time window or consecutively in time. Also two or more groups may be indicated by multiple transmission rounds of the incident signal. That means the first round indicates a first group and the second round indicates the second group. The rounds may happen consecutively or within a certain time window.

In accordance with yet further embodiments, the reader device 200 may target a specific radio device, like radio device 100 by including into the signal 204, for example into a preamble of a paging message 208, the device-ID of the radio device 100. In such embodiments, the combination of a specific group-ID and a specific device-ID is used to update a group membership of the addressed radio device. For example, the reader device 200 may send a group-ID and a device-ID, which causes the radio device identified by the device-ID to activate/deactivate one or more groups. For example, in FIG. 3, the radio device 100 may belong to groups identified by group-ID1 and group-ID2, which are referred to as active groups of the plurality of different device groups. For example, radio device 100 may belong to a first device group identified by group-ID1 which include radio devices attached to a product being temperature-sensitive, and to a second device group identified by group-ID2 which, for example, is associated with radio devices being attached to products requiring a specific shipment. Assuming that the product to which the radio device 100 is attached experiences a change in its handling requirements, in accordance with this embodiment, the membership of the radio device 100 may be adapted. For example, in case the product to which the radio device 100 is attached is no longer temperature-sensitive, the reader device 200 may transmit the group-ID1 together with the device-ID in the signal 204 causing the radio device 100 to deactivate the first group.

In accordance with other embodiments, rather than deactivating a group, a new group may be activated. For example, if the product to which the IoT device 100 is attached, in addition to being temperature-sensitive, now requires specific storage requirements (e.g., refrigerated, climate-controlled by means of this embodiment a third group associated with the storage requirements is signaled so that, in addition to the already active first and second groups, also the third group is activated.

This embodiment is advantageous as the described reconfiguration allows the radio device to adapt its settings with regard to the device groups to which it belongs so that, for example, certain communication parameters or energy thresholds may be adjusted according to the updated group requirements. For instance, the newly activated group-ID2 configures larger duty cycles compared to the ones configured only by group-ID1. Another example could be that group-ID2 has a more restrictive channel access parameters (i.e., maximum access delay, number of retransmission attempts), and therefore, the device starts using the most restrictive ones.

In accordance with further embodiments, rather than sending a single group in the signal 204, also two or more groups may be included into the signal 204 together with the device-ID thereby causing a deactivation of one or more currently active groups and/or an activation of currently inactive groups, e.g., additional groups indicated in the signal 204.

Figure 5:
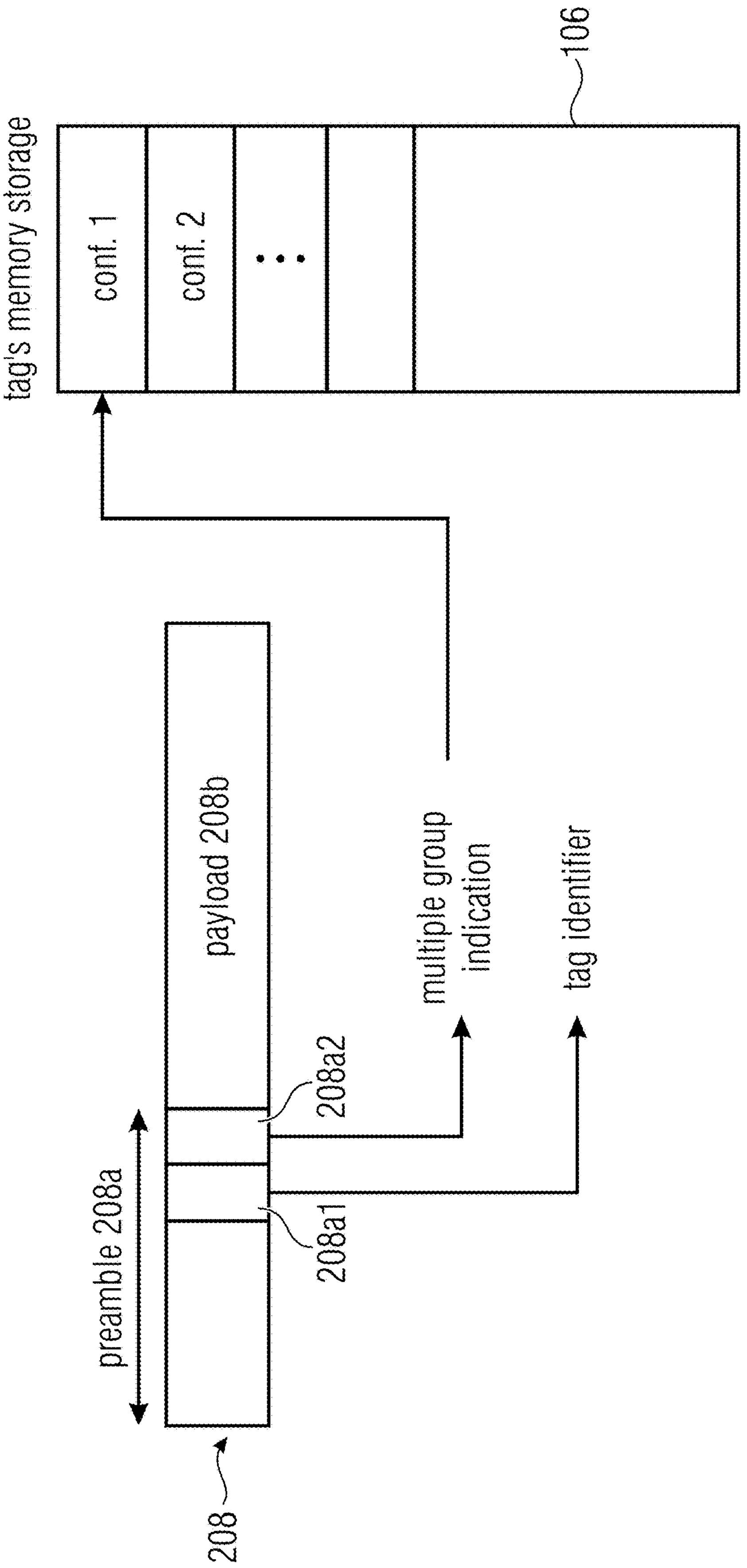
FIG. 5 illustrates an association of a multi-group indication with one or more configurations in accordance with embodiments of the present invention.

In accordance with further embodiments, the above-described approach may not only be used for a membership update, but it may also be used for configuring certain parameters of the radio device 100. More specifically, in accordance with such an embodiments, the radio device 100 may include a plurality of different configurations that may be stored in the memory 106. The signal 204 includes a preamble and a payload portion. In the preamble, one or more group-IDs are indicated, also referred to as a multiple group indication, as well as the device-ID, like a tag identifier of the radio device 100. The group-IDs are associated with the different configurations and when sending a device-ID and a group-ID, the payload portion of the signal 204 may be used for transmitting configuration parameters which the radio device 100 uses for configuring or updating the configuration with the configuration parameters included in the payload portion of the signal 204. FIG. 5 illustrates an association of a multi-group indication with one or more configurations in accordance with embodiments of the present invention. The radio device's memory 106, in addition to the data shown in FIG. 3, further stores several configurations, Conf. 1, Conf. 2, . . . . The message 208 transmitted by the signal 204 includes a preamble 208*a* and a payload portion 208*b*. The preamble 208*a* includes the device or tag identifier 208*a*1 and the group-ID or multiple group indication 208*a*2. The message 208 is associated with a specific configuration stored in the radio device memory 106, like physical, PHY, layer parameters or MAC layer parameters. For example, the reader device 200 transmits the message 208 including one or more group-IDs together with the device-ID. The respective group-IDs correspond to the different configurations stored in the radio device 100, like predefined settings for transmission power levels, frequency bands or time-slot allocations. Upon receiving the signal 204, the radio device accesses the memory 106 to configure the communication parameters, for example the PDRCH parameters, according to the information included in the payload section 208*b* of the message 208.

In accordance with embodiments of the inventive approach, the radio device 100 may be configured so as to belong to one or more specific device groups only for a predetermined time. Such a temporal clustering capability may be beneficial in changing scenarios where the part or the product to which the radio device is attached experiences a change in conditions quite frequently. For example, radio devices provided on an industrial equipment may adjust the device group associations based on an operational status. For example, signs of wear of the industrial equipment may lead to a switch to a specific device group which allows triggering preventative maintenance procedures. The radio device 100 may be configured or preconfigured with an event triggered timer or an event causing the temporal modification of the group association.

Figure 6:
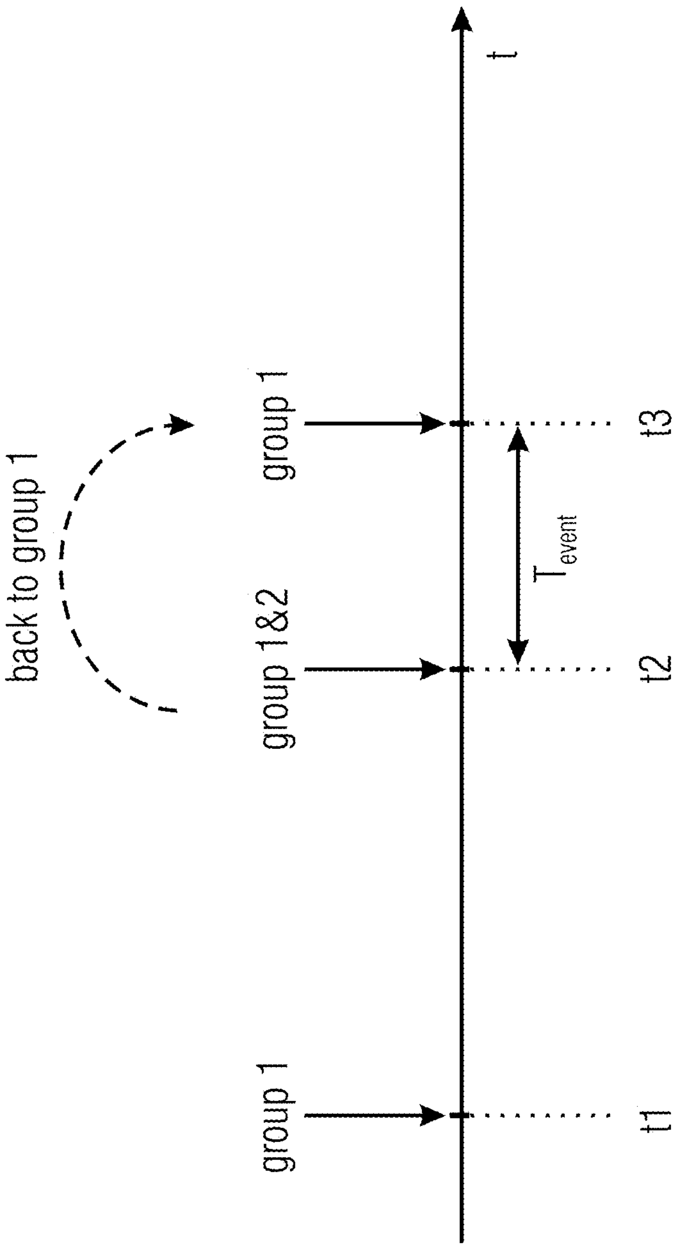
FIG. 6 illustrates a group removal following a triggered condition in accordance with embodiments of the present invention.

FIG. 6 illustrates a group removal following a triggered condition in accordance with embodiments of the present invention. More specifically, the radio device 100 is assumed to be associated with a first device group identified by group-ID1, i.e., the group 1 is currently active (see time t1). Following a certain event at a time t2, the radio device 100 activates group 2 identified by a group-ID2, so that the radio device 100 at the time t2 belongs to both device groups 1 and 2. At time t2 an event timer $T_{event}$ is started. Once the timer lapsed at t3, the group 2 activated at time t2 is deactivated at time t3. Thus, in accordance with embodiments, responsive to one or more configured or preconfigured events, the radio device 100 may temporarily activate/deactivate one or more groups.

In accordance with other embodiments, responsive to the one or more events, the radio device 100 may also temporarily deactivate one or more or all of the active groups, e.g., such that no currently inactive groups are activated. For example, for a certain time, all group memberships of the radio device may be suspended for a certain period, like the duration of the timer $T_{event}$. For instance, if measurements taken by a device remain stable, and do not exhibit significant variations, frequent reporting may no longer be necessary. In such scenario, the device may temporarily deactivate groups associated with high-frequency reporting, until conditions for high-frequency reporting are met again.

The one or more configured or preconfigured events may comprise a configured or preconfigured timer indicating that the radio device remained in a certain condition or state for a certain time, or a configured or preconfigured command counter, or an operational state of the radio device, or a state of a communication performed by the radio device.

The configured or preconfigured timer may indicate a duration of inactivity of the radio device, e.g., a period of inactivity. The timer may be set responsive to an indication in the incident signal 204, or responsive to a specific command included in the incident signal 204, like a read command, or a write command, or a lock command.

The configured or preconfigured command counter may track certain incidents, e.g., a number of completed inventory rounds, and, responsive the counter reaching a configured or preconfigured threshold, the radio device may temporarily deactivate the one or more currently active groups, or temporarily activate the one or more currently inactive groups.

The operational state of the radio device may be one or more of the following:

- a wear of the radio device, e.g., if one or more wear parameters reach a configured or preconfigured threshold, the radio device may temporarily deactivate the one or more currently active groups, or temporarily activate a group identifying a device group allowing a performance of one or more preventative maintenance procedures, an energy condition of the radio device, e.g., responsive to a poor signal quality, a potential loss of connectivity, or a battery state falling short of a configured or preconfigured threshold, the radio device may temporarily deactivate the one or more currently active groups, or temporarily activate a group identifying a device group allowing to conserve energy, an energy harvesting condition, e.g., responsive to an amount of energy obtained by energy harvesting falls short of a configured or preconfigured threshold, the radio device may temporarily deactivate the one or more currently active group, or temporarily activate a group identifying a device group allowing to conserve energy and/or a low-power operation, certain data to be transmitted, e.g., responsive to an increase in the amount of data to be transmitted exceeding a configured or preconfigured threshold, the radio device may temporarily deactivate the one or more currently active group-IDs, or temporarily activate a group-ID associated with a higher transmission periodicity and/or transmission priority; for instance, a sensor senses a drop on the temperature, air quality, etc., and starts to collect data more frequently; such data generation may be needed to be sent more periodically due to memory storage constraints in the AIoT device or with lower channel access delay, a sensor value above or below a certain threshold e.g. a motion sensor, a distance sensor or a temperature sensor exceeding a predefined threshold or an accelerometer detecting a high acceleration; for example in case of the temperature sensor a device might be in a specific group if the temperature exceeded a certain threshold indicating that the product is no longer good.

The state of a communication performed by the radio device may be one or more of the following:

a number of consecutive packet failures, e.g., if a number of consecutive packets not successfully received or transmitted reaches a configured or preconfigured threshold, the radio device may temporarily deactivate the one or more currently active group, or temporarily activate a group identifying a device group for inactive or low-activity devices, a change in the signal strength, e.g., if the radio signal strength drops below a certain threshold the radio device may, temporarily deactivate the one or more currently active groups, or temporarily activate a group-ID associated with more robust communication parameters, e.g., lower coding rates for more robust error correction, a channel access delay exceeding a preconfigured threshold, e.g., if the time or number of attempts taken to access the channel exceeds a preconfigured threshold, the radio device may, temporarily deactivate the one or more currently active groups, or temporarily activate a group associated with non-time sensitive tasks.

In accordance with embodiments, for example, a sudden spike in temperature data could trigger a sensor group related to high-priority temperature monitoring, enabling the device to join a group that transmits data more frequently. Similarly, an air quality sensor exceeding pollution thresholds could prompt the activation of a group optimized for immediate reporting to address potential hazards.

In accordance with embodiments, in an emergency, a sensor detecting a hazardous condition may override less critical devices to transmit data first.

In accordance with embodiments, the radio device 100 may change its group memberships based on the above mentioned preconfigured timer. For example, the radio-device may switch from a first device group to a second device group (for example deactivating a currently used/active group and activating a currently unused/inactive group) after a predefined period of inactivity or upon reaching a specific time threshold. For instance, this threshold may be a configured or preconfigured duration of a time interval, e.g., 10 seconds, 1 minute or 2 hours, in which a criteria is fulfilled, e.g., battery level less than a certain level. The timer may be configured or preconfigured responsive to a signaling from the reader device that may be included in the signal 204 or it may be associated with a specific command received from the reader device, like a read command or a write command or a lock command. For instance, the lock command causes subsequent write operations to a designated memory bank to be prevented. If the lock command is not changed by another command from the reader device 112 for a certain period of time, the radio device 100 automatically reverts to a previous group association or adopts a new group configuration.

In accordance with other embodiments, the radio device may only drop its group membership for a certain period of time without joining any other group unless receiving an explicit indication from the reader device.

In a further embodiment, the group association of the reader device, as indicated by the group-IDs, may be linked to a configured or preconfigured command counter. The radio device may track the number of completed inventory rounds in which it participated, and the group situation may be adjusted accordingly. For example, the radio device may initially be part of a first group for regular inventory checks, however, after a predefined number of inventory rounds, the device may switch to a different group with less monitoring, i.e., with less inventory checks.

In yet a further embodiment, a change in the group association may be configured or preconfigured in accordance with a threshold or event associated with variations of the RSSI or SNR or SINR or RSRP or with energy harvesting conditions. For example, if the radio device 100 senses during a wake time a significant drop in RSSI, this may indicate a poor signal quality or a potential loss of connectivity. This may cause the radio device 100 to automatically switch to a different device group to conserve energy. Also, changes in energy harvesting, such that a reduction of power obtained from a solar source or from an RF harvesting source may trigger the radio device to switch to a group optimized for low-power operation.

In another embodiment, the change in a group membership may be configured or preconfigured with a number of consecutive times the packet is not successfully received. For example, if the radio device detects multiple consecutive transmission failures to the reader device 200 it may automatically switch to a designated group reserved for inactive or low-activity devices which helps to reduce network congestion by limiting unnecessary transmission attempts.

In yet another embodiment, the change in group membership may be based on an internal parameter such as data to be transmitted, a battery state or a sensor value being above or below a certain threshold. For instance, a sensor value senses a drop on its measurements, and therefore, it needs to start collecting more data, which triggers a group change to one with higher transmission periodicity. A further example could be a temperature sensor exceeding a predefined threshold or an accelerometer detecting a high acceleration.

In accordance with further embodiments of the present invention, the inventive multi-group identification may be employed for indicating certain states of a radio device 100, for example a power state thereof. In accordance with such embodiments, the radio device 100 may indicate its battery status implicitly through a device group it belongs to, without a need to explicitly transmit specific data indicating its battery status, like an energy harvesting matrix, e.g., a rate of energy harvesting or a source type, or a current level of the battery or energy storage. This embodiment is advantageous as it minimizes communication overhead between the reader device 200 and the radio devices 100 to 100*c* by reducing the amount of data transmitted within the network. Moreover, since no activity of the reader device is required for providing this information, additional energy may be conserved.

In accordance with this embodiment, a reader device 100 may be configured or preconfigured to change its device group based on an available energy level. For example, the radio device 100 may include the plurality of group-IDs, each of which is associated with a device group associated with a certain energy level. For example, a first group may include all radio-devices having a high energy level, for example an energy level above a first threshold, a second group-ID is associated with a device group for radio devices having a medium energy level below the first threshold and above a second threshold, and a third group-ID is associated with a device group including radio devices having a low energy level below the second threshold. Thus, the different device groups correspond to different energy levels, such as low, medium or high energy storage. Each device group may further be associated with distinct communication parameters such as a data transmission frequency, i.e., how often data transmissions occur, a sleep cycle duration or a maximum data rate. For example, a radio device belonging to the first device group is considered to perform data transmissions more frequently and to use shorter sleep cycles when compared to radio devices belonging to the other device groups which may have reduced transmission rates, longer sleep cycles or lower data rates for extending the battery life of the radio devices.

Figure 7:
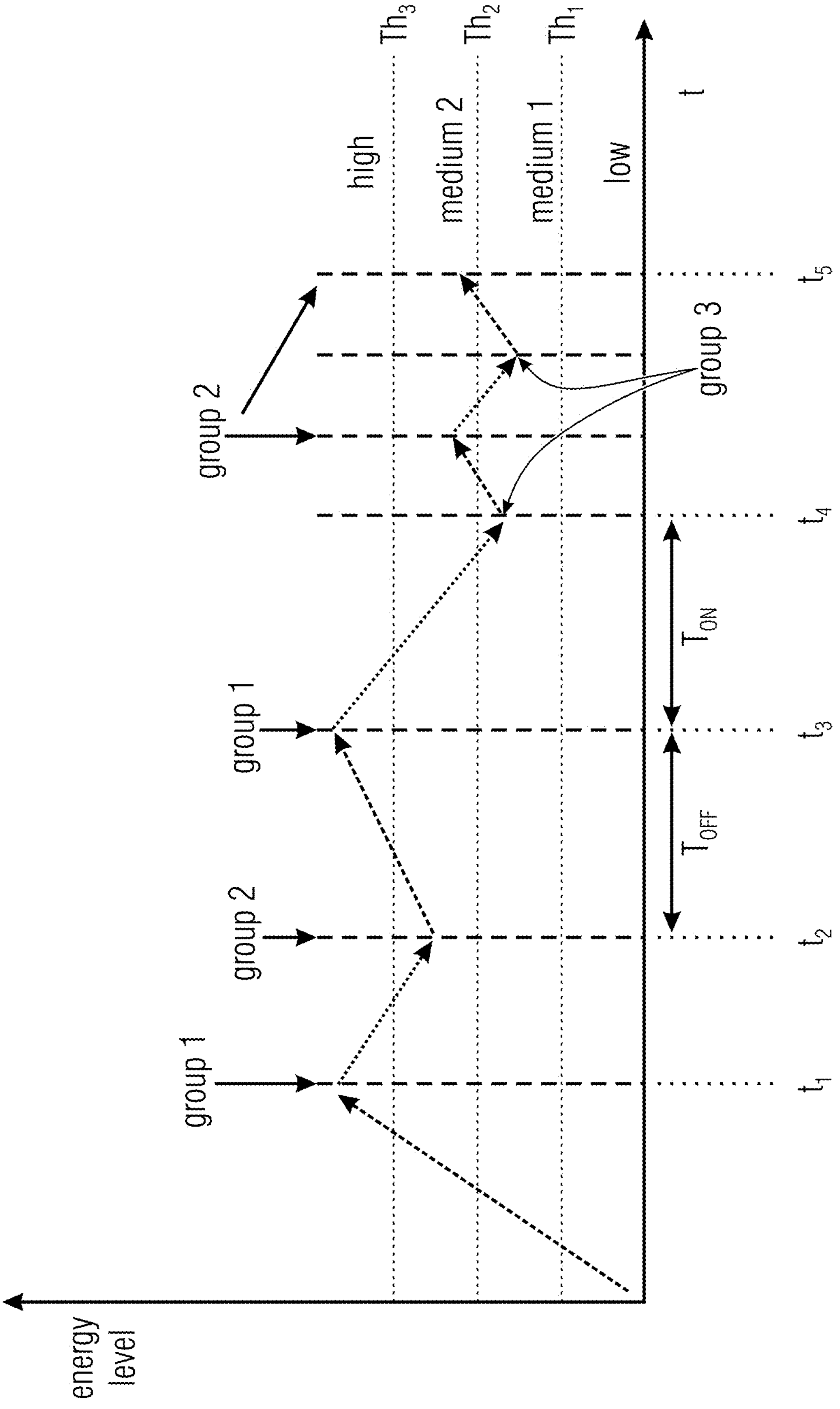
FIG. 7 illustrates a group change dependent on an energy storage level in accordance with embodiments of the present invention.

FIG. 7 illustrates a group change dependent on the energy storage level in accordance with this embodiment. FIG. 7 illustrates the energy level within a radio device, for example, a battery, over time, assuming four states, namely high, medium1, medium2 and low. A low state is assumed when the energy level in the energy storage of the radio device is below a first threshold Th1. When the energy level is above threshold Th1 but below threshold Th2 the energy level is medium1. When the energy level is above the second threshold Th2 and below a third threshold Th3 the energy level is medium2, and when the energy level is above the third threshold Th3 the energy state is high. A radio device may include four groups associated with the low, medium1, medium2 and high states depicted in FIG. 7 and, dependent on the actual energy level, the radio device may change the device group. At time t1, when the energy level is high, the radio device may belong to the first device group, at time t2 when being in the medium2 range the radio device may switch to device group 2 in accordance with which the user device may be inactive for a certain time period Toff, for example while recuperating so that the energy level is increased, as is shown at t3 so that the radio device may return to the first group. As is indicated at t4, after a certain active period Ton the battery level may drop to the medium 1 range, causing the radio device to switch to group 3. Between times t4 and t5, the radio device switches between device groups 2 and 3 due to the energy level fluctuating between medium 1 and medium 2 states.

In accordance with other embodiments, a group change may be dependent a signal strength, e.g., responsive to the signal strength the device may activate or deactivate certain groups.

Figure 8:
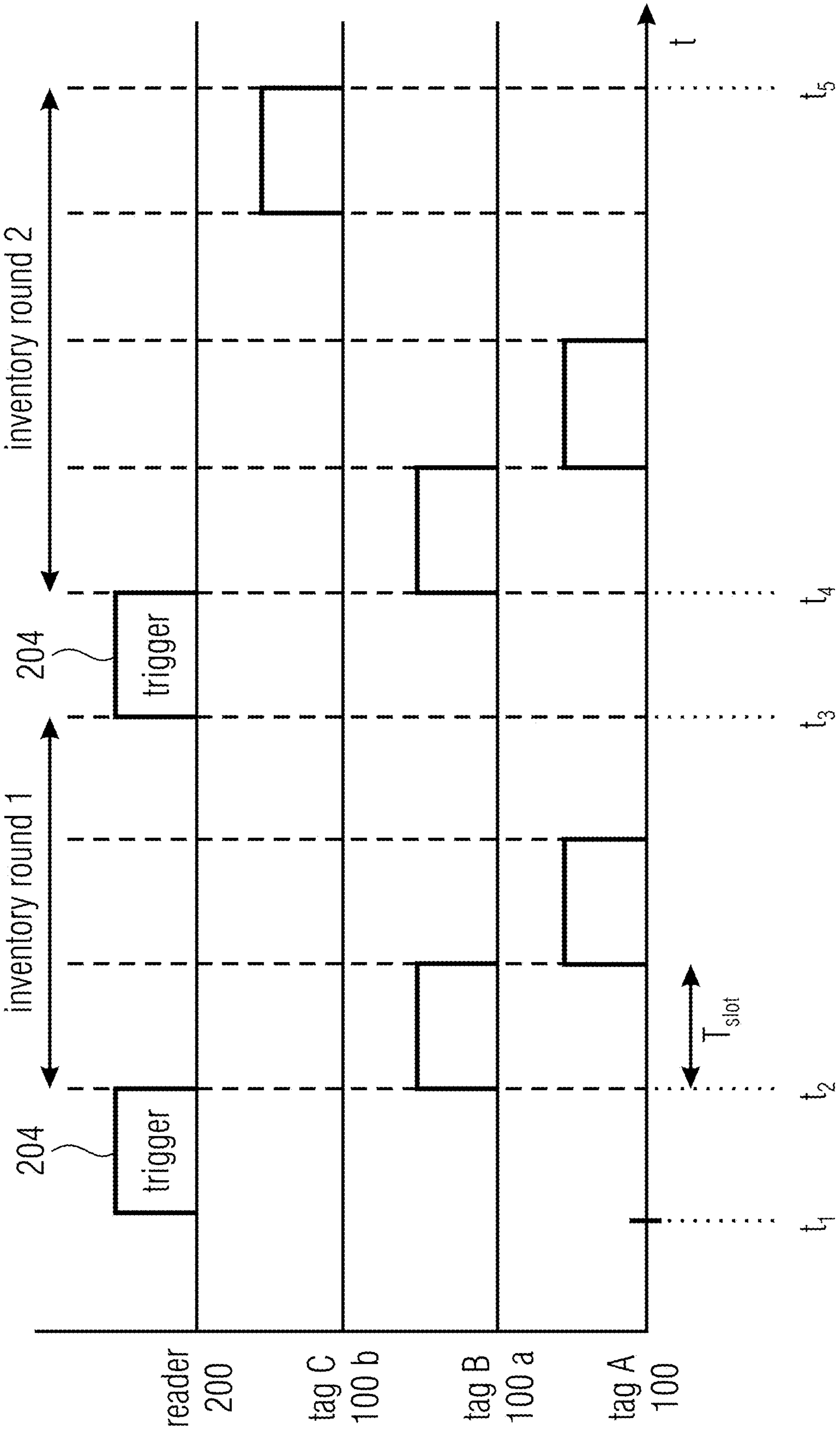
FIG. 8 illustrates schematically a access scheme using slotted ALOHA as an access protocol.

In accordance with further embodiments of the present invention, the inventive multi-group identification may be employed for addressing contention issues in the wireless communication network. In accordance with embodiments, the wireless communication network may use slotted ALOHA as an access protocol which divides the duration of an inventory round into slots, and the radio devices select one slot for a transmission or for use on a random basis. The randomized procedure uses a backoff mechanism to draw a number from the interval $[0, 2^{Q-1}]$ where the Q-value, which is to be used by the radio devices, is announced by the reader device at the start of each round, for example within the trigger signal 204. FIG. 8 illustrates schematically the access scheme. At a time t1 the reader device 200 sends the signal 204, like a trigger signal, for starting a first inventory round of three time slots between times t2 and t3. At time t3 the first inventory round is completed and the reader device 200 may send a further trigger signal 204 for starting a second inventory round starting at t4 and including four time slots until time t5. For the first inventory round the Q value included in the trigger signal is 3, and for the second inventory round the Q value is 4. In the first inventory round it is assumed that the trigger signal 204 includes groups which are included in the radio devices 100 and 100*a*, labeled in FIG. 8 as tag A and tag B while the reader device 100*b* labeled as tag C, is not addressed by the trigger signal 204, i.e., there is no match between the groups in tag C and the groups included in the trigger signal 204. Responsive to the trigger signal 204, tag A and tag B select the illustrated time slots for a data transmission using a backscattered signal. In the second inventory round, the trigger signal 204 includes groups which are included in each of the three radio devices tag A to tag C which select the illustrated time slots between t4 and t5 for their backscattered transmission. The Q-value is announced by the reader device at the start of each round. Based on that value, radio devices set their backoff timer independently by drawing a random number. Each time the reader announces the beginning of a slot, each radio device decreases its own backoff timer until reaching a value of zero. At that point, a radio device attempts a random access procedure. If succeeded, data transmission is performed. Otherwise, the radio device turns off until the beginning of the next round.

Although slotted ALOHA works well in low-density scenarios, contention may become an issue in environments where a high number of radio devices, like several hundred thereof, coexist. In accordance with embodiments of the present invention, such situations are addressed by device groups associated with specific channel access parameters, like the Q value or a maximum number of retransmissions within a certain inventory round. Further, the respective device groups including different channel access parameters may be associated with respective priorities so that the reader devices may be associated or may be group members of device groups with different priorities. For example, a first number of radio devices may be associated with a device group having a high priority and a first number of access parameters, the group, while other radio devices may be group members of a second device group having a lower priority than the first group and using second channel access parameters.

For instance, radio devices assigned to a high priority device group may be given a smaller contention window size allowing them to attempt channel accesses more frequently and thereby reducing a waiting time for a transmission or a retransmission. On the other hand, radio devices or tags associated with lower priority device groups may be assigned larger contention window sizes, thereby increasing the waiting times and reducing the frequency of transmission attempts. A higher priority may also be associated with a shorter channel access time, e.g., by selecting a shorter random access counter.

In accordance with another embodiment, using the multiple groups may lead to an override mechanism in situations where the contention parameters associated with the highest priority device group take precedence over the other device groups. For example, a significant drop on the measurement values may trigger on a radio device or tag, which is associated with a first device group of low priority and a second device group of high priority, that the contention values of the second device group may override those of the first device group. Thus, A significant drop on the measurement values may trigger that parameters of a group with higher priority to take precedence over other groups.

In accordance with yet another embodiment, the channel access parameters may be combined. More specifically, when considering the above example of a radio device associated with the first and second device groups, the associated channel access parameters may be combined using, for example, a weighted average approach. For example, the weights may be placed on the priority levels of each device group or on other criteria. As a result, a new set of channel access parameters may be created from the resultant weight association. For instance, the contention window may be primarily influenced by the higher-priority group due to its timely requirements, whereas the maximum number of retransmissions may be more relaxed due to being determined by the low-priority group.

For instance, the contention window determination may be based in the following manner:

High priority >CW [0,16], weight 70%

Low priority group >CW [0,64], weight 30%

Hence, the resulting calculation may be the average resulting into a contention window of [0,31].

By modifying the parameters an adaption to different conditions is possible, like network load or timing requirements), without needing to deactivate/activate groups to use a specific set of access parameters. The weights may be determined based on metrics by the device (i.e., PER or BER, etc.)

In accordance with further embodiments, the reader devices may employ a sequential contention strategy in accordance with which a reader-device or tag attempts to access the channel using the contention parameters or channel access parameters of each device group in a predefined sequence. For instance, the sequence may be based on a hierarchy of the priorities associated with the respective device groups so that, initially, channel access is attempted using the channel access parameters associated with the first device group having, for example, a low priority. If this channel access is not successful, the channel access parameters of a second device group having a higher priority may be used for the channel access attempt. If this attempt is also not successful, the channel access parameters of a third device group having the highest or lowest priority may be employed for the channel access attempt.

Figure 9:
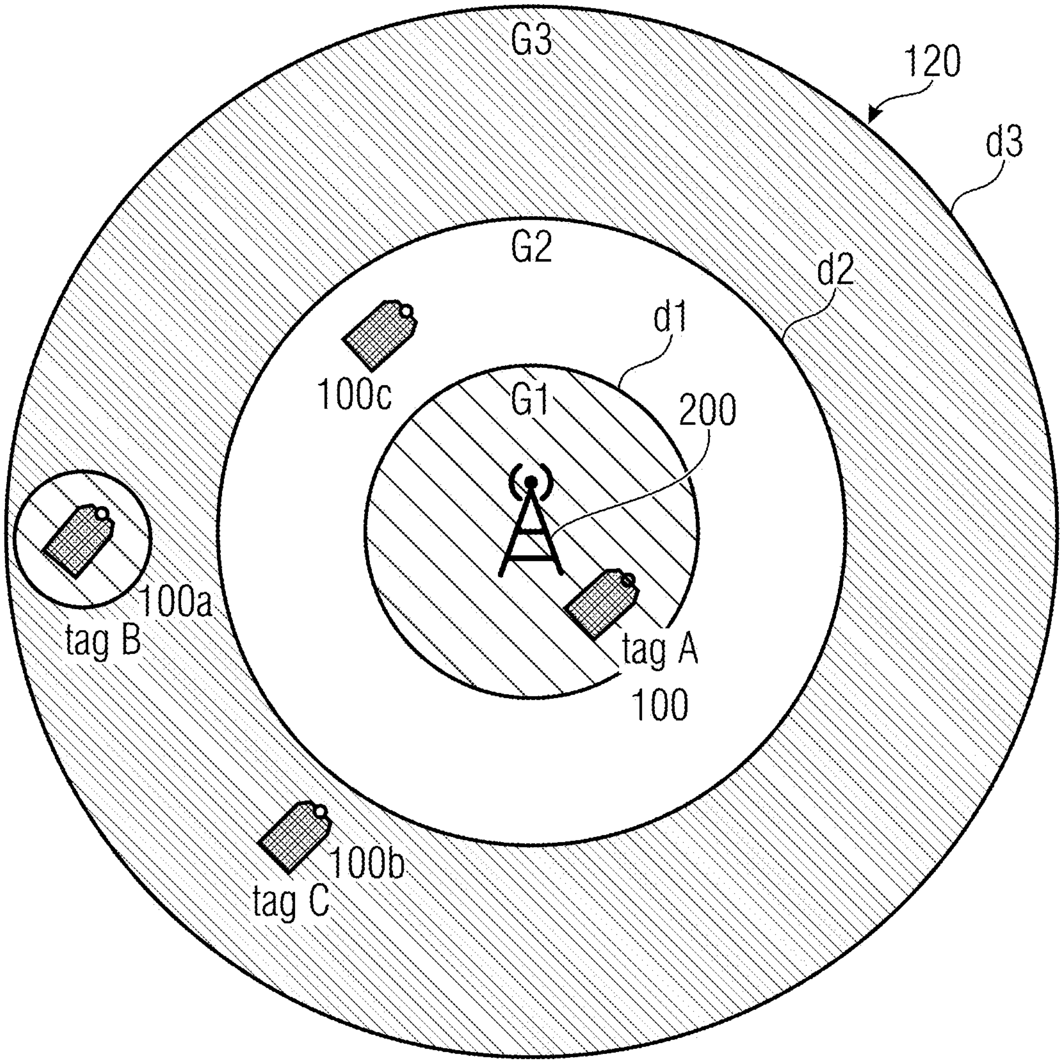
FIG. 9 illustrates a use of different access parameters based on groups associated with different distances to a reader device according to embodiments of the present invention.

In accordance with other embodiments, the respective device groups having the different channel access parameters may be associated with respective distance from a reader device. FIG. 9 illustrates an embodiment using different access parameters based on groups associated with different distances to a reader device. FIG. 9 illustrates the reader device 200 and a communication range 210 within which the reader devices or tags 100 to 100*c* are located. Three device groups G1 to G3 identified by group-ID1, group-ID2 and group-ID3 exist, each device group being associated with different channel access parameters. The respective device groups define channel access parameters dependent on a distance from the reader device 200. The channel access parameters of the first device group G1 are used for reader devices at a distance d1 from the reader device 200, the channel access parameters of device group G2 are used for radio devices or tags located between distance d1 and distance d2, and the channel access parameters for the third device group G3 are used for radio devices located between d2 and d3 or between d2 and the maximum communication range 210. In the embodiment depicted in FIG. 9, the first radio device 100 or tag A is located within the first range around the reader device 200 so that among the plurality of stored group G1 is active indicating that tag A belongs to the first device group which uses a first set of channel access parameters (first range=distance from reader device being less than d1). The reader devices 100*a* and 100*b* are located in a third range between d2 and d3 so that the group G3 is active causing the radio devices 100*a* and 100*b* to make use of third access parameters for the third device group. The radio device 100*c* is located in the second range between d1 and d2 so that group G2 is active and the radio device 100*c* uses a second set of access parameters as defined by the second device group GC for accessing the network.

Figure 10:
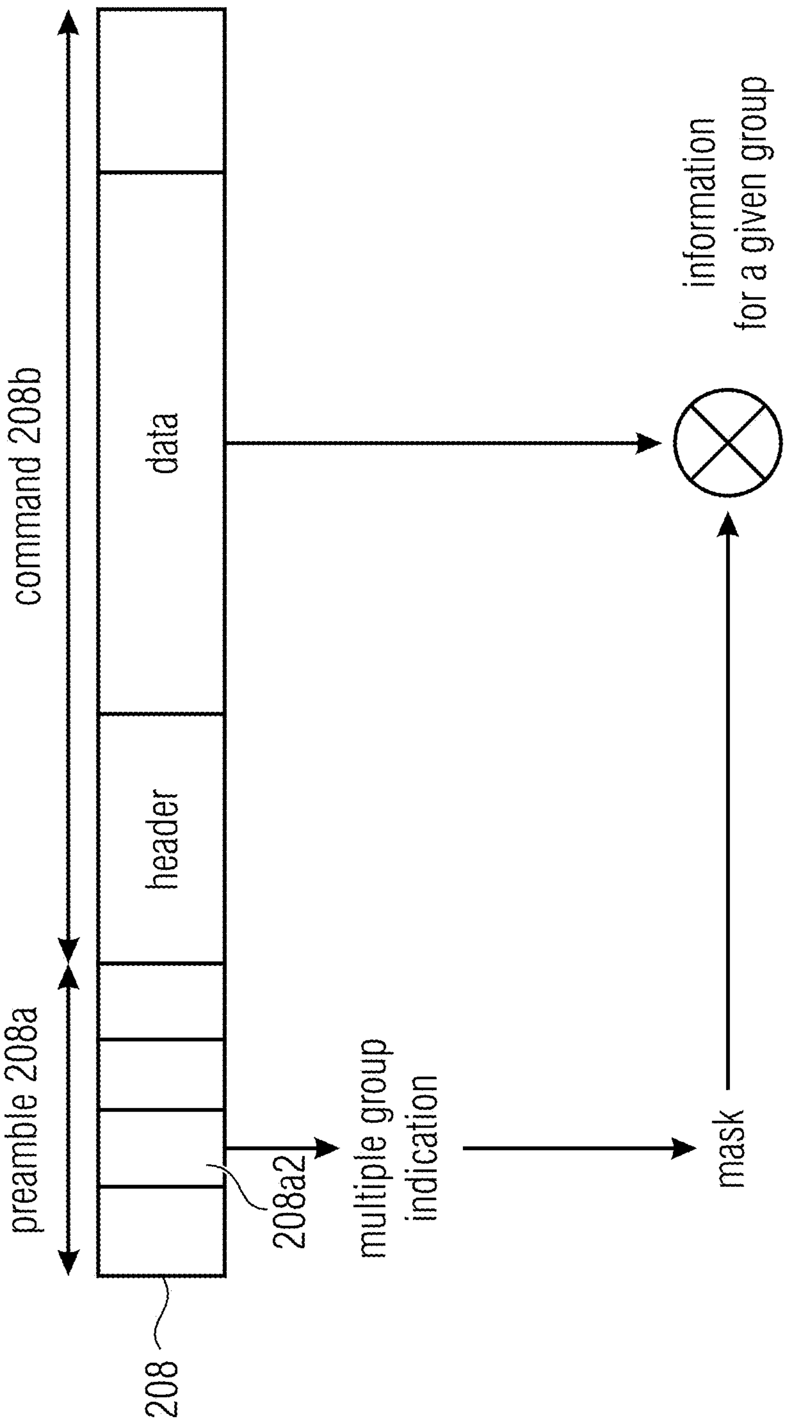
FIG. 10 illustrates performing an update of the radio device configuration according to embodiments of the present invention.

In accordance with further embodiments of the present invention, the inventive multi-group identification may be employed for configuring the radio devices of the wireless communication network. When considering, e.g., 3GPP, a configuration or reconfiguration of network devices is typically handled by the RRC layer. However, in accordance with embodiments, the radio devices may not be capable or may not be configured for such a configuration/reconfiguration procedure. For example, the Ambient IoT framework operates without the configuration/reconfiguration approach handled via the RRC layer. In accordance with the embodiments of the present invention, a configuration of the respective radio devices is enabled by allowing the reader device to use certain commands, like the read/write commands for configuration purposes. For example, the read command may be used to retrieve from one or more radio devices configuration parameters used by these devices, while the write command may be used to configure one or more radio devices with system settings or system parameters. In accordance with embodiments, a single system configuration may be transmitted to the plurality of reader devices across different device groups. The system configuration may comprise one or more of channel access parameters, including priority levels, frequency offset and/or access cycles, and security settings, including encryption and/or authentication. By announcing the multiple group IDs in the signal 204, for example in a preamble of a frame, all radio devices including the indicated group-IDs may be triggered to update a configuration. FIG. 10 illustrates an embodiment of the message 208 used for performing an update of the radio device configuration. The message 208 includes the preamble 208*a* and the payload 208*b*. Within the preamble 208*a* the multiple group indication 208*a*2 is included indicating at least one group-ID. The payload data 208*b* includes a header portion and a data portion, the data portion including the updated configuration information which is used by all radio devices matching one or more of the group-IDs indicated in the preamble 208*a*. Thus, by announcing the multiple groups in the preamble of the frame, all devices within the respective device groups are triggered to update their configurations using the data in the payload section. For example, device groups having similar characteristics may be configured with the same system parameters allowing a single configuration message to address all such device groups simultaneously.

In accordance with another embodiment, radio devices in different device groups may use a configured or preconfigured mask, as also illustrated in FIG. 10, to receive information specific for their device group. The masks may be embedded into the group-ID, as indicated in the embodiment of FIG. 10, enabling the inclusion of multiple parameters for different groups within a single message. For example, the mask may use a group-id, a device-id, a device type or a sensor value as a filter.

Further embodiments of the present invention use the inventive multi-group identification for a semi-static configuration of transmit parameters. For example, for D2R scheduling, the following information may be indicated to a radio device using a device group configuration or a subgroup configuration: Time domain resource, frequency domain resources, MCS-lag information, like a code rate, a modulation, repetitions, chip duration, ID associated with the radio devices, like a device ID or a group ID, repetitions.

In the embodiments described above, reference has been made to a wireless communication system including, as illustrated in FIG. 3, the radio devices 100 to 100*c* and the reader device 200. In accordance with further embodiments, the wireless communication network may include a plurality of reader devices for addressing respective radio devices within their communication range. Also, the wireless communication network may include more than one additional network entity 300.

In accordance with embodiments, the reader devices 200 may be network entities of a certain wireless communication system, for example a network entity of a 3GPP system or a WiFi system, like a user equipment, base station or relay node in the 3GPP system or a WiFi station or access point in a WiFi system. In such embodiments, the radio devices may be addressed in accordance with the respective transmission protocol used by the wireless communication system, i.e., the radio devices may be directly addressed by the network entities of the respective wireless network.

In accordance with other embodiments, the reader devices, for example the above mentioned ultra-low complexity/ultra-low power consumption devices may not operate in accordance with the communication protocols as defined by a standard of the wireless communication network to which, for example, the reader device belongs, for example they may not operate fully in accordance with the 3GPP standard the WiFi standard. Such radio devices, like ultra-low complexity/power ambient IoT devices, may only be addressable by appropriately adapted reader devices 200, like Ambient IoT readers or scanners. In accordance with such embodiments, the reader device 200 communicates with the respective radio devices using, for example, the ALOHA protocol, and acts as an intermediate or relay node or as a gateway node to the wireless communication system. For example the IDs of the radio devices may be translated into the International mobile subscriber identity, IMSI, and/or temporary mobile subscriber identity, TMSI. The IMSI is a unique identifier associated with a SIM card of a subscriber, while the TMSI is a temporary identifier that is used to provide a level of privacy and security by avoiding transmissions of the IMSI over the air interface. In a cellular network, these identifiers are used in the identification and communication with the UEs, and the reader device 200, as an intermediate node, translates the device-IDs of the radio devices 100 to 100*c* to respective identifiers being in conformity with the communication standard of the wireless communication system. Thus, the respective radio devices may also be addressed by network entities of the wireless communication network to which the reader device is connected, thereby integrating low complexity, low power radio devices into an existing wireless communication network, like the 3GPP network or the WiFi network.

In accordance with embodiments, the one or more reader devices 200 may be configured or preconfigured with a large number of virtual addresses, for example by using ESIM so that messages may be directly forwarded from and/or to an NG-RAN node or a core network, like 5GC.

Figure 11A:
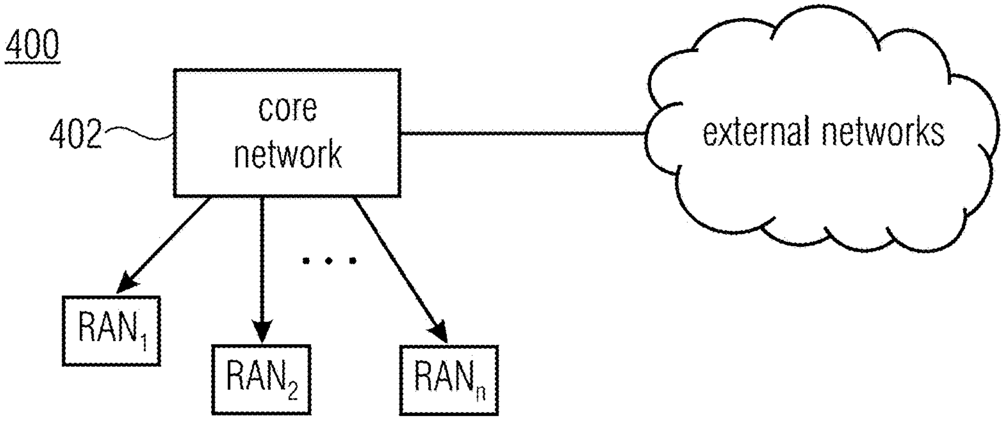
FIG. 11A and FIG. 11B are schematic representations of an example of a terrestrial wireless communication network in which embodiments of the present invention may be implemented.
Figure 11B:
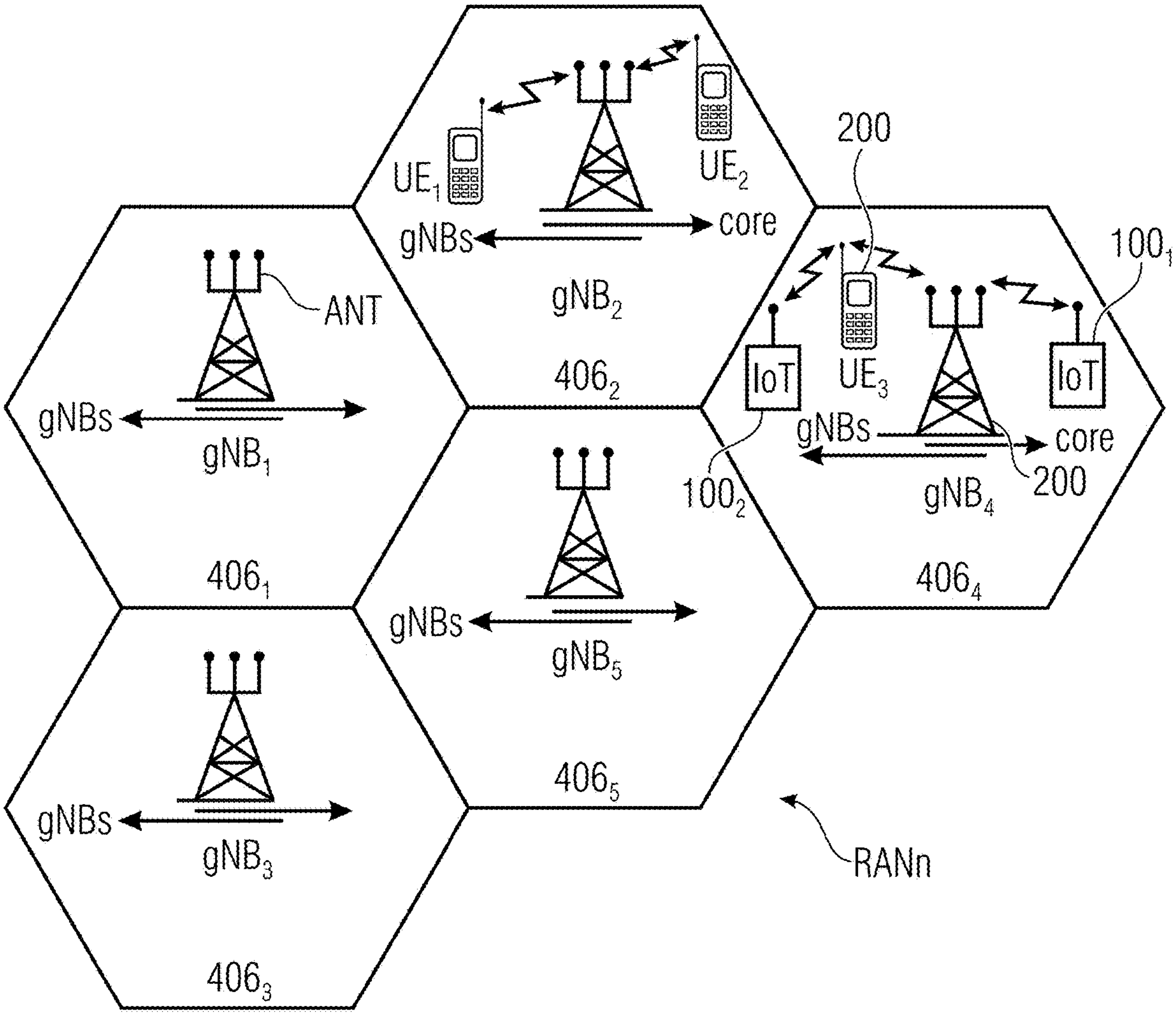

FIG. 11A and FIG. 11B schematically represent an example of a terrestrial 3GPP wireless network 400 including, as is shown in FIG. 11A, the core network, CN, 402 and one or more radio access networks, $RAN_1$, $RAN_2$, . . . , $RAN_N$. FIG. 11B is a schematic representation of an example of a radio access network $RAN_n$ including one or more base stations gNB1 to gNB5 each serving a specific area surrounding the base station as is schematically represented by the cells 4061 to 4065. The base stations are provided to serve users within a cell, for example, in the licensed and/or unlicensed bands. The term base station, BS, may refer to a gNB in 5G networks, an ENB in OMTS/LTE/LTE-A/LTE-APO or just a base station in other mobile communication standards, for example a base station in a 6G network. The BS may also comprise integrated access and backhaul, IAB, modes, e.g., an IAB donor and/or an IAB node consisting of a central unit, CU, as well as distributed units, DU. FIG. 11B further illustrates the IoT devices $\mathbf{100}_1$, $\mathbf{100}_2$ operating in accordance with the teachings of the present invention. In accordance with first embodiments, the inventive IoT device $\mathbf{100}_1$ is addressed directly by gNB4 acting as reader device 200 described above with reference to FIG. 3. On the other hand, IoT device $\mathbf{100}_2$ may be a radio device which is not addressable using the communication protocol of the wireless communication network depicted in FIG. 11. In such embodiments, UE3 acts as the reader device 200 used for addressing IoT device $\mathbf{100}_2$. UE3 may act as the above described intermediate or relay node for a communication via the base station gNB4.

In accordance with other embodiments, the wireless communication network may be a WiFi network and the illustrated elements may be WiFi elements, for example the base stations illustrated may refer to an access point, AP, in any one of the WiFi standards belonging, for example, to the IEEE 802.11-family.

Although the respective aspects and embodiments of the inventive approach have been described separately, it is noted that each of the aspects/embodiments may be implemented independent from the other, or some or all of the aspects/embodiments may be combined.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments of the present invention, a RAN network entity, like the base station or gNB, comprises one or more of the following: a macro cell base station, or a small cell base station, or a central unit of a base station, or a distributed unit of a base station, or a road side unit (RSU), or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

In a specific embodiment, the radio device may be a A-IoT device that supports A-IoT radio interface towards a reader. The read may belong to at least one or more groups of a plurality of different device groups by way of the following circumstances: A globally unique AIoT Device Permanent Identifier may be allocated to each AIoT Device. An AIoT Device Permanent Identifier is assigned either by an operator or by a third party. The AIoT Device Permanent Identifier is used to identify an AIoT Device and locate the entity where the AIoT Device related information is stored. The AIoT Device Permanent Identifier may include, aside optional further components not mentioned herein, Domain Information which may, e.g., include none, one or more of the following: a) a PLMN Identifier (PLMN=Public Land Mobile Network; A PLMN may be identified by a globally unique PLMN code, which consists of a MCC (Mobile Country Code) and MNC (Mobile Network Code)), b) a Network Identifier (NID), and c) a third party identifier used to identify a third party. Whether one or more of a-c are, as part of Domain Information, included in the AIoT Device Permanent Identifier, may be indicated by ID type information, which may also be included in the AIoT Device Permanent Identifier. Thus, the device would belong to a group, namely the one identified by the Domain Information, which, in turn, may assume many different value states corresponding to different device groups. The A-IoT device's transmitter may be a CW transmitter using a CW waveform for D2R backscattering which is a single-tone unmodulated sinusoid. The A-IoT device thus designed may receive an incident signal which indicates at least one group of the plurality of different device groups in the process when the device is powered on: The A-IoT device starts monitoring PRDCH for an R2D message. Herein, a concept called A-IoT paging is used to send an A-IoT Paging message to one or more A-IoT devices. The Paging ID field is used to select a group of devices. An A-IoT device always monitors for the A-IoT Paging message, and determines whether the device is selected to initiate an access procedure. A selected group is indicated by including a mask for a group-ID in the incident signal which is then used as filtering information to identify or filter multiple AIoT Devices and is constructed by one or multiple components (e.g. ID Type, PLMN Identifier, NID, third party identifier and Identification Information) of the AIoT Device Permanent Identifier. The filtering information may, thus, include a list of filtering elements. A filtering element may include Information indicating a component of the AIoT Device Permanent Identifier that is used to match the bitstring. A bitstring may also be comprised by the filtering information and is used to by the receiving A-IoT devices for a comparison with the component(s) indicated. An Offset from the beginning of the indicated component, which indicates the start location in the indicated component to be used to compare with the corresponding bitstring, might also be part of the filtering information. When the indicated component is PLMN ID, NID or Third Party Identifier, the Offset might not be included in the filtering information, as the whole component might then have to be compared with the bitstring. Alternatively, the Offset might always be included. That is, the A-IoT compares whether it belongs to the targeted device group by comparing the bitstring with the identified components or identified parts of the identified components, with determining that it belongs to the targeted group in case of a match with the bitstring. The comparison may involve the A-IoT device forwarding the content of the Paging ID field to upper layers and, if the upper layers indicate that the Paging ID is matched, the device considering the device is selected, and, if the device is selected, the device initiating a Contention-Based Random Access procedure. As far as the D2R transmission is concerned, the A IoT device, when a Contention-Based Random Access (CBRA) procedure is initiated due to a reception of A-IoT Paging message, selects an access occasion among access occasions configured in the A-IoT Paging message for D2R transmission of Access Random ID message, wherein the start of the access occasion may be provided by the A-IoT Paging message or a Access Trigger message. If needed, the device monitors for Access Trigger message until it has received a A-IoT Paging message. Then, the device initiates the transmission of Access Random ID message. The A-IoT Paging message' fields may comprise, among optional other information, and in addition to the Paging ID field containing the AIoT Identification Information, D2R Scheduling information containing the physical layer parameters to be used for D2R transmission such as in form child fields serving as Frequency Resource Indication and Time Resource Indication, respectively.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 12:
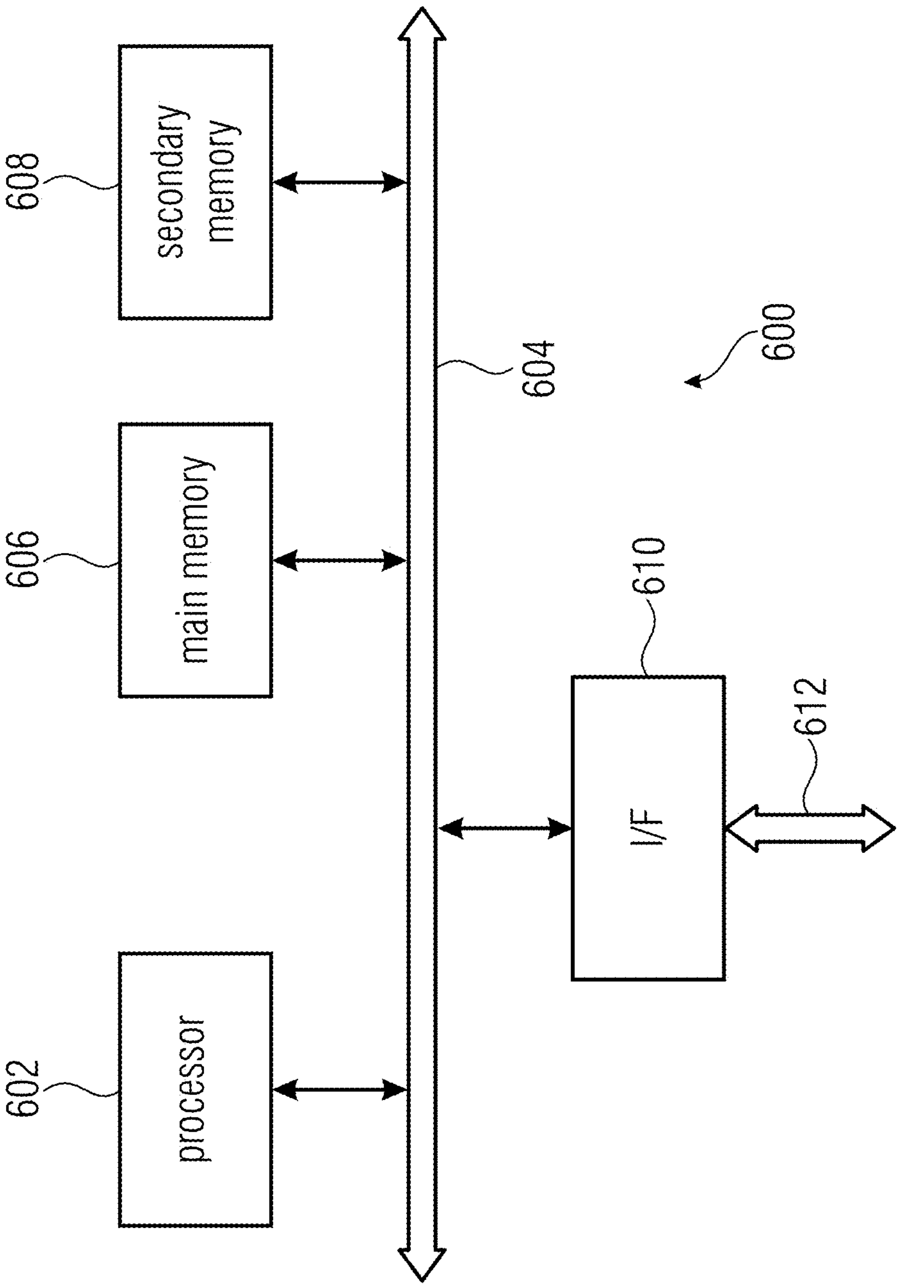
FIG. 12 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 12 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A radio device for a wireless communication network, comprising a backscatter transmitter for transmitting a signal using a backscattered signal, wherein the radio device belongs to at least one or more groups of a plurality of different device groups, wherein the radio device is to receive an incident signal which indicates at least one group of the plurality of different device groups, and wherein the radio device is to determine whether or not the at least one group indicated by the incident signal matches one or more or all of the groups to which the radio device belongs to, wherein if there is a match, the radio device transmits a signal using the backscattered signal, and/or if there is no match, the radio device does not transmit a signal using the backscattered signal.

2. The radio device of claim 1, wherein the radio device belongs to two or more groups of a plurality of different device groups.

3. The radio device of claim 1, wherein the radio device comprises a plurality of different group identifiers, group-IDs, the group-IDs identifying the different device groups.

4. The radio device of claim 3, wherein the radio device comprises a plurality of communication configurations, each of the plurality of communication configurations being associated to a group, each communication configuration comprising one or more communication parameters, the incident signal indicates one or more groups, and responsive to the incident signal indicating one or more groups to which the radio device belongs to, the radio device is to configure the communication parameters of the communication configurations, which match the one or more groups indicated in the incident signal.

5. The radio device of claim 1, wherein the radio device comprises a radio device identifier, device-ID.

6. The radio device of claim 1, wherein the at least one group is indicated by including the group-ID and/or a mask for a group-ID in the incident signal.

7. The radio device of claim 1, wherein the incident signal is received in a plurality of reception occasions.

8. The radio device of claim 7, wherein the plurality of reception occasions are consecutive in time.

9. The radio device of claim 1, wherein the radio device is to transmit a signal using the backscattered signal responsive to the incident signal.

10. The radio device of claim 1, wherein the incident signal indicates two or more groups of the plurality of different device groups and comprises a message indicating the two or more groups, and/or a first message comprising a first number of the two or more groups, and a second message comprising a second number of the two or more groups, wherein the second message is communicated immediately following the first message or at a configured or preconfigured time after the first message.

11. The radio device of claim 1, wherein a group of the plurality of different device groups to which the radio device belongs to is an active group, and/or a group of the plurality of different device groups to which the radio device does not belong to is an inactive group.

12. The radio device of claim 1, wherein the different device groups comprise a plurality of device groups, each of the plurality of device groups associated with a certain operational state of the radio device, the radio device comprises an active group, and/or one or more inactive groups, and the radio device is to deactivate the active groups and/or activate one of the currently inactive groups, thereby indicating the certain operational state of the radio device.

13. The radio device of claim 1, wherein the different device groups comprise a plurality of device groups, each of the plurality of device groups associated with one or more certain channel access parameters when performing a certain operation.

14. The radio device of claim 13, wherein each of the plurality of device groups is further associated with a priority, and wherein the one or more certain channel access parameters of a device group of a first priority are superior to the one or more certain channel access parameters of a device group of a second priority which is lower than the first priority.

15. The radio device of claim 14 wherein a higher priority is associated with a shorter channel access time.

16. The radio device of claim 14, wherein, if the radio device belongs to two or more of the plurality of device groups, the radio device is to apply the one or more certain channel access parameters associated with the device group comprising the highest or lowest priority.

17. The radio device of claim 14, wherein, if the radio device belongs to two or more of the plurality of device groups, the radio device is to combine the one or more certain channel access parameters associated with the device groups using, e.g., a weighted average approach.

18. The radio device of claim 17, wherein the weights are be based on the priorities levels of two or more of the plurality of device groups, or other predefined criteria.

19. The radio device of claim 14, wherein, if the radio device belongs to two or more of the plurality of device groups, the radio device is to attempt a channel access using the one or more certain channel access parameters associated with the device groups in sequence.

20. The radio device of claim 1, wherein the radio device is to receive an incident signal which indicates, in addition to the at least one group, a system configuration for one or more or all of the at least one groups indicated by the incident signal.

21. The radio device of claim 20, wherein the system configuration comprises one or more of the following:

channel access parameters, comprising priority levels, frequency offset and/or access cycles, a duty cycle, security settings, comprising encryption and/or authentication.

22. The radio device of claim 20, wherein the radio device comprises a configured or preconfigured mask to receive the system information specific to device groups the radio device belongs to, or a mask is associated with the group, enabling the system information specific to device groups the radio device belongs to.

23. The radio device of claim 1, wherein the radio device is to receive an incident signal which indicates, one or more transmit parameters for a backscattered signal transmission.

24. The radio device of claim 23, wherein the one or more transmit parameters comprise one or more of the following:

time domain resources, frequency domain resources, code domain resources,

MCS-like information,

Chip duration,

ID(s) associated with device(s), repetitions of the transmissions in case of an unsuccessful first transmission.

25. A reader device for a wireless communication network, comprising a transmitter for transmitting a signal to one or more radio devices of the wireless communication network, the radio devices using a backscattered signal for a communication within the wireless communication network and wherein belonging to at least one or more groups of a plurality of different device groups, wherein the reader device is to transmit a signal which indicates at least one of the plurality of different device groups for allowing a radio device is to determine whether or not the at least one group indicated by the signal matches one or more or all of the groups to which the radio device belongs to, wherein if there is a match, the radio device transmits a signal using the backscattered signal, and/or if there is no match, the radio device does not transmit a signal using the backscattered signal.

26. The reader device of claim 25, wherein the receiver is to transmit the signal to one or some or all radio devices of the wireless communication network which are within a communication range of the reader device.

27. The reader device of claim 26, wherein for transmitting the signal to all of the radio devices of the wireless communication network, the reader device does not include any device-ID into the signal.

28. A method for operating a radio device for a wireless communication network, the method comprising transmitting a signal using a backscattered signal, wherein the radio device belongs to at least one or more groups of a plurality of different device groups, wherein the radio device receives an incident signal which indicates at least one group of the plurality of different device groups, and wherein the radio device determines whether or not the at least one group indicated by the incident signal matches one or more or all of the groups to which the radio device belongs to, wherein if there is a match, the radio device transmits a signal using the backscattered signal, and/or if there is no match, the radio device does not transmit a signal using the backscattered signal.

* * * * *